United States Patent
Titus et al.

[11] Patent Number: 6,037,560
[45] Date of Patent: Mar. 14, 2000

[54] ENHANCED TUNABLE PLASMA-MELTER VITRIFICATION SYSTEMS

[75] Inventors: Charles H. Titus, Newtown Square, Pa.; Daniel R. Cohn, Chestnut Hill, Mass.; Jeffrey E. Surma, Kennewick, Wash.

[73] Assignee: Integrated Environmental Technologies, LLC, Carle Place, N.Y.

[21] Appl. No.: 09/158,361

[22] Filed: Sep. 22, 1998

Related U.S. Application Data

[63] Continuation of application No. 08/621,424, Mar. 25, 1996, Pat. No. 5,811,752, which is a continuation-in-part of application No. 08/492,429, Jun. 19, 1995, Pat. No. 5,798,497, which is a continuation-in-part of application No. 08/382,730, Feb. 2, 1995, Pat. No. 5,666,891.

[51] Int. Cl.[7] .................................................. B23K 10/00
[52] U.S. Cl. ............................... 219/121.37; 219/121.36; 219/121.54; 219/121.52; 110/346; 373/18
[58] Field of Search ......................... 219/121.36, 121.37, 219/121.48, 121.43, 121.52, 121.53; 110/246–250, 346; 588/900; 75/10.19; 373/18–22

[56] References Cited

U.S. PATENT DOCUMENTS

| | | |
|---|---|---|
| 2,927,143 | 3/1960 | Jensen . |
| 3,104,352 | 9/1963 | Tiemann . |
| 3,436,641 | 4/1969 | Biringer . |

(List continued on next page.)

FOREIGN PATENT DOCUMENTS

WO 87/05775   9/1987   WIPO .

OTHER PUBLICATIONS

Bitler et al., U.S. Serial No. 08/274,829, "Process for Remediation of Lead–Contaminated Soil and Waste Battery Casings".

"The Solid Wast Dilemma: An Agenda for Action", Toxic Subt. J., vol. 9, No. 1, pp. 9–54 (1989).

(List continued on next page.)

*Primary Examiner*—Mark Paschall
*Attorney, Agent, or Firm*—Choate, Hall & Stewart

[57] ABSTRACT

The present invention provides tunable waste conversion systems and apparatus which have the advantage of highly robust operation and which provide complete or substantially complete conversion of a wide range of waste streams into useful gas and a stable, nonleachable solid product at a single location with greatly reduced air pollution to meet air quality standards. The systems provide the capability for highly efficient conversion of waste into high quality combustible gas and for high efficiency conversion of the gas into electricity by utilizing a high efficiency gas turbine or an internal combustion engine. The solid product can be suitable for various commercial applications. Alternatively, the solid product stream, which is a safe, stable material, may be disposed of without special considerations as hazardous material. In the preferred embodiment, the arc plasma furnace and joule heated melter are formed as a fully integrated unit with a common melt pool having circuit arrangements for the simultaneous independently controllable operation of both the arc plasma and the joule heated portions of the unit without interference with one another. The preferred configuration of this embodiment of the invention utilizes two arc plasma electrodes with an elongated chamber for the molten pool such that the molten pool is capable of providing conducting paths between electrodes. The apparatus may additionally be employed with reduced use or without further use of the gases generated by the conversion process. The apparatus may be employed as a net energy or net electricity producing unit where use of an auxiliary fuel provides the required level of electricity production. Methods and apparatus for converting metals, non-glass forming waste streams and low-ash producing inorganics into a useful gas are also provided. The methods and apparatus for such conversion include the use of a molten oxide pool having predetermined electrical, thermal and physical characteristics capable of maintaining optimal joule heating and glass forming properties during the conversion process.

22 Claims, 12 Drawing Sheets

U.S. PATENT DOCUMENTS

| | | |
|---|---|---|
| 3,470,444 | 9/1969 | Bixby . |
| 3,767,831 | 10/1973 | Plockinger et al. . |
| 3,779,182 | 12/1973 | Camacho ................................ 110/8 R |
| 3,789,127 | 1/1974 | Bowman . |
| 3,812,620 | 5/1974 | Titus et al. . |
| 3,841,239 | 10/1974 | Nakamura et al. ...................... 110/8 C |
| 3,918,374 | 11/1975 | Yamamoto et al. . |
| 3,995,100 | 11/1976 | Jaeger .......................................... 13/9 |
| 4,099,227 | 7/1978 | Liptak . |
| 4,105,437 | 8/1978 | Liu .......................................... 75/70 R |
| 4,110,821 | 8/1978 | Hisano et al. . |
| 4,326,842 | 4/1982 | Adachi et al. . |
| 4,431,612 | 2/1984 | Bell et al. . |
| 4,461,010 | 7/1984 | Titus . |
| 4,466,824 | 8/1984 | Gauvin et al. . |
| 4,644,877 | 2/1987 | Barton et al. . |
| 4,766,598 | 8/1988 | Titus et al. . |
| 4,802,919 | 2/1989 | Fey . |
| 4,818,836 | 4/1989 | Bebber et al. . |
| 4,895,678 | 1/1990 | Ohtsuka et al. . |
| 4,922,099 | 5/1990 | Masuda et al. . |
| 5,095,828 | 3/1992 | Holden et al. . |
| 5,177,304 | 1/1993 | Nagel . |
| 5,240,656 | 8/1993 | Scheeres . |
| 5,280,757 | 1/1994 | Carter et al. . |
| 5,284,503 | 2/1994 | Bitler et al. . |
| 5,298,233 | 3/1994 | Nagel . |
| 5,363,826 | 11/1994 | Takaoka . |
| 5,370,724 | 12/1994 | Bitler et al. . |
| 5,439,498 | 8/1995 | Bitler et al. . |
| 5,451,738 | 9/1995 | Alvi et al. .......................... 219/121.59 |
| 5,484,978 | 1/1996 | Hedberg et al. . |
| 5,552,675 | 9/1996 | Lemelson . |
| 5,611,307 | 3/1997 | Watson . |

OTHER PUBLICATIONS

Buelt et al., "In Situ Vitrification of Transuranic Waste: An Updated Systems Evaluation and Applications Assessment", PNL–4800 Supp. 1, pp. ix–xiv and 79–86 (Mar. 1987).

Carter et al., "Municipal Solid Waste Feasibility of Gasification with Plasma Arc", Industrial and Environmental Applications of Plasma, Proceedings of the First International EPRI Plasma Symposium, CMP Report No. 90–9, pp. 13–1 13–13 (Mar. 1990).

Chapman, "Evaluation of Vitrifying Municipal Incinerator Ash", Ceramic Transactions: Nuclear Waste Management IV, Ceramic Transactions, American Chemical Society, vol. 23, pp. 223–233 and 349–394 (1991).

Denison et al., "Recycling & Incineration: Evaluating the Choices", pp. 104–145 and 177–200 (1990).

Graef et al., "Product Distribution in the Rapid Pyrolysis of Biomass/Lignin for Production of Acetylene", American Chemical Society, pp. 293–312 (1981).

Hamrick, "Biomass–fueled Gas Turbines", Clean Energy From Waste and Coal, ACS Symposium Series 515, American Chemical Society, pp. 78–89 (1993).

Johansson et al., "Renewable Energy: Sources for Fuels and Electricity", Island Press, pp. 726–729, 734–747 (1993).

ENHANCED TUNABLE PLASMA-MELTER VITRIFICATION SYSTEMS

CROSS-REFERENCE TO RELATED APPLICATION

This application is a continuation of Ser. No. 08/621,424 filed Mar. 25, 1996, now U.S. Pat. No. 5,811,752, which is a continuation-in-part application of U.S. Ser. No. 08/492,429, filed Jun. 19, 1995, which application is a continuation-in-part application of U.S. Ser. No. 08/382,730, filed Feb. 2, 1995, both of which are now pending and both of which are incorporated herein by reference.

TECHNICAL FIELD

The present invention generally relates to systems for enhanced tunable arc plasma-melter vitrification systems. The present invention more particularly relates to vitrification systems utilizing independently controllable arc plasma-joule heated melter combinations as integrated systems to provide tunable waste treatment and power production facilities for processing solid waste.

BACKGROUND OF THE INVENTION

The disposal of solid waste has become a major issue over the past few decades due to space limitations for landfills and problems associated with siting new incinerators. In addition, increased environmental awareness has resulted in a major concern for many large metropolitan areas and to the country as a whole to ensure that the disposal of solid waste is properly handled. See e.g., USA EPA, The Solid Waste Dilemma: An Agenda for Action, EPA/530-SW-89-019, Washington, D.C. (1989).

Attempts have been made to reduce the volume and recover the energy content of municipal solid waste (MSW) and other waste through incineration and cogeneration. The standard waste-to-energy incinerator will process the solid combustible fraction of the waste stream, produce steam to drive a steam turbine, and as a result of the combustion process produce a waste ash material. Typically, the ash is buried in a municipal landfill. Current trends and recent rulings, however, may require such material to be shipped to landfills permitted for hazardous waste. This will substantially increase ash disposal costs.

There is also increased public concern about gaseous emissions from hazardous and municipal landfills and the possibility of contamination of groundwater. Another disadvantage associated with incinerator systems is the production of large quantities of gaseous emissions resulting in the need for costly air pollution control systems in an attempt to decrease emission levels to comply with requirements imposed by regulatory agencies.

In order to overcome the shortcomings associated with incinerator systems, attempts have been made in the prior art to utilize arc plasma torches to destroy toxic wastes. The use of arc plasma torches provides an advantage over traditional incinerator or combustion processes under certain operating conditions because the volume of gaseous products formed from the plasma arc torch may be significantly less than the volume produced during typical incineration or combustion, fewer toxic materials are contained in the gaseous products, and under some circumstances the waste material can be glassified.

For example, U.S. Pat. No. 5,280,757 to Carter et al. discloses the use of a plasma arc torch in a reactor vessel to gasify municipal solid waste. A product having a medium quality gas and a slag with a lower toxic element leachability is produced thereby.

U.S. Pat. No. 4,644,877 to Barton et al. relates to pyrolytic destruction of polychlorinated biphenyls (PCBs) using a plasma arc torch. Waste materials are atomized, then ionized by a plasma arc torch and are then cooled and recombined into gas and particulate matter in a reaction chamber. U.S. Pat. No. 4,431,612 to Bell et al. discusses a hollow graphite electrode transfer arc plasma furnace for treatment of hazardous wastes such as PCBs.

A process for remediation of lead-contaminated soil and waste battery material is disclosed in U.S. Pat. No. 5,284,503 to Bitler et al. A vitrified slag is formed from the soil. Combustible gas and volatized lead, which are formed from the waste battery casings, are preferably transferred to and used as a fuel for a conventional smelting furnace.

The systems proposed by Barton et al., Bell et al., Carter et al., and Bitler et al. have significant disadvantages. For example, such disadvantages include insufficient heating, mixing and residence time to ensure high quality, nonleachable glass production for a wide range of waste feeds. Additionally, these systems are often difficult to restart the waste destruction process after the furnace has been shut-down for a relatively short period of time. Moreover, hearth size and feeder design are significantly limited since furnace walls must be relatively close to the arc plasma which is the only heat source. High thermal stress on the walls of the furnace often occurs as a result of the limitation on the hearth size.

Prior art arc plasma torch type furnaces with metal electrodes further may be limited by short electrode lifetime when used at higher DC current. Therefore, to achieve higher power output, the arc potential must be raised by lengthening the arc. This results in radiative thermal losses to the furnace side walls, high waste material volatilization into offgas and metal electrode (torch) ineffectiveness. In addition, there are often difficulties associated with prior art transfer arc plasmas in start-up and restarting of such arc plasma systems when cold, nonelectrically conducting material is being processed.

Moreover, certain types of waste streams do not contain materials having proper glassification and/or electrical conducting characteristics. These waste streams can be particularly difficult to process. For example, waste containing materials that do not glassify or vitrify such as tires from automobiles and other vehicles have been difficult to process. Similarly, low-ash producing organics have typically been difficult to process in a manner that produces a glassified product. In addition, highly electrically conductive waste streams with waste metals are not amenable to effective heating in joule heated melter processing systems.

Thus, while such prior art attempts have been useful, there remains a need in the art for a robust, easy to operate waste conversion system which minimizes hazardous gaseous emissions and which maximizes conversion of a wide range of solid waste into useful energy and produces a product stream that is in a safe, stable form for commercial use or that does not require special hazardous waste considerations for disposal. It would therefore be desirable to provide a robust, user friendly and highly flexible method and apparatus for processing and converting a wide range of waste materials into useful energy and stable products while minimizing hazardous gaseous emissions, thereby overcoming the shortcomings associated with the prior art.

SUMMARY OF THE INVENTION

It is an object of the present invention to provide methods and apparatus for increased conversion of solid waste materials such as municipal, industrial, hazardous, medical, radioactive and tire waste to useful energy with greatly reduced air pollution.

It is another object of the invention to provide methods and apparatus for converting a wide range of waste materials to useful commercial products or to safe, stable products which are suitable for disposal.

It is another object of the invention to provide methods and apparatus for converting waste materials using combinations of independently controllable arc plasmas and joule heated melters as tunable integrated systems.

It is yet a further object of the invention to provide methods and apparatus for converting waste materials in which joule heated melters and arc plasmas are operated simultaneously in fully integrated systems with common molten pools and with independent power controls to each.

It is yet a further object of the invention to provide methods and apparatus for vitrifying waste materials using a combination joule heated melter and arc plasma as a tunable integrated system.

It is still a further object of the invention to provide methods and apparatus for converting waste materials using tunable, rapid pyrolysis, thereby providing high purity gases suitable for combustion.

It is yet a further object of the invention to provide methods and apparatus for highly effective conversion of waste materials to gaseous fuel capable of generating electricity through a relatively small, highly efficient gas turbine or internal combustion engine.

It is still a further object of the invention to provide waste conversion units that can be net energy producing and/or that can provide a given level of electricity for outside use by utilizing an auxiliary fuel, such as natural gas, diesel or some other fuel, in varying amounts in the gas turbine or internal combustion engine.

It is still a further object of the invention to provide methods and apparatus for processing metals, non-glass forming wastes and low-ash producing organics in a molten oxide pool in combination with a fully integrated tunable arc plasma joule heated melter system.

It is still a further object of the invention to provide methods and apparatus for processing metals, non-glass forming wastes and low-ash producing organics under conditions sufficient to produce a low to medium BTU gas suitable for combustion in a gas turbine and/or internal combustion engine.

These and other objects of the invention are provided by systems which are capable of processing hazardous waste, municipal waste (MSW), tire waste, and other waste forms into stable, nonleachable products that are suitable for commercial use or that can be disposed of without risk to the environment. The systems also minimize air emissions and maximize production of useful gases for the generation of electricity.

The present invention provides a compact waste processing system that has the advantage of complete or substantially complete conversion of waste materials into useful gases and/or product streams at a single location. The combination of the arc plasma furnace and the joule heated melter as a tunable, integrated system with gas turbine or internal combustion engine generating equipment provides a net energy producing waste treatment and power production facility that is capable of being deployed in relatively small modular units and that can be easily scaled to handle large volumes of municipal solid waste.

The primary processing unit preferably includes a DC electrode arc plasma or plasmas for heating waste material and has joule heating capabilities for the melt pool. Preferably, the electrode arcs are DC electrode arcs with electrodes constructed of graphite. The use of DC arc electrodes in combination with a special electrical circuit ensures simultaneous independent control of the arc plasma (s) and the joule heated melter.

The primary mode of operation of the arc plasma(s) and joule heated melter is pyrolysis (oxygen starved operation). In a preferred embodiment, the system is operated such that rapid pyrolysis occurs, thereby producing a gas with higher purity as compared with other methods of pyrolysis.

The arc plasma and joule heated melter components are fully integrated with a common molten pool such that the system is capable of simultaneous independently controllable, i.e. tunable, operation of these components. The arc plasma occurs between a graphite electrode or electrodes and the molten material. The DC electrodes can be positioned in the unit such that an arc current is provided above or through the molten pool of waste material being processed. Alternatively, the arcing electrodes can be positioned to provide a current through the molten pool to a submerged, counter electrode(s) at or near the bottom of the unit. The power supply source for the DC arcs can also be controlled to vary these current paths.

As set forth herein, the tunable fully integrated systems employ electrical and mechanical design features to maximize flexibility, effectiveness and throughput of the waste material being treated. The joule heated melter provides deep volume heating and is capable of maintaining a constant temperature throughout the melt pool with uniform mixing characteristics, thereby resulting in a high quality, homogenous glass product. The arc plasma(s) provides the necessary radiant surface and bath heating for processing feed materials in a highly efficient manner and at significantly higher rates than other technologies. Consequently, high processing rates for vitrification of a large variety of materials into high quality, stable, non-leachable glass can be obtained. In addition, simultaneous independently controllable operation of the arc plasma and joule heated melter is provided by predetermined arc melter configurations and electrical circuits.

While not meant to be limiting, the arc plasmna preferably is operated by a DC arc which provides a high degree of plasma stability and controllability, and the joule heated melter is operated by AC power. The DC arc and AC powered joule heated melter arrangement ensures the ability to independently control and operate each component.

The use of the melter in combination with the arc plasma provides more uniform heating than prior art techniques. In addition, deep volume heating provided by the joule heated glass melter facilitates ease of operation and provides a constant heat source to maintain sufficient electrical conductivity in the waste material for rapid restart of the arc plasma, which uses an electrical conduction path through the waste material. The fully integrated system further allows the furnace walls to be further from the arc plasma since there is an additional heat source provided. The increase in wall distance from the arc plasma increases feed options and reduces thermal stress on the furnace lining. The present invention also allows the use of electrodes having a long life and a very wide range of arc plasma and joule heater power levels.

The independent control of the arc plasma(s) and the joule heated melter power provides a continuously tunable mix of surface and deep volume heating which can be optimized for different phases of operation. For example, additional heating may be required for pouring glass or maintaining the glass pool temperature while additional surface heating may be necessary during the initiation of feeding waste material. In addition, different mixes of surface and volume heating are appropriate for different waste streams. The ratio of surface to deep volume heating may be less for municipal waste, for example, than for industrial waste containing large amounts of metals and other materials having high melting temperatures.

In one embodiment of the invention, tunable arc plasma-melter systems are employed utilizing a molten oxide pool. The composition of the molten oxide pool is modified to have electrical, thermal and physical characteristics capable of processing metals, non-glass forming wastes and low-ash producing wastes in a manner sufficient to generate a low to medium BTU gas and/or vitrified products. The conductivity of the molten pool is controlled by adding melt modifier material(s) so that the joule heated portion of the system can effectively maintain the temperature of the melt under various operating conditions, such as 100% joule heating operation. The electrical resistivity of the molten pool is preferably above 1 Ohm-cm, and more preferably, between 1–200 Ohm-cm.

This embodiment of the invention provides tunable arc plasma-melter systems exhibiting a high degree of controllability and efficiency for a wide variety of waste streams that have been particularly difficult to process in the past. For example, non-glass forming wastes such as iron metals and tires; low-ash producing organics such as plastics, oils, liquids and the like; and waste streams such as hazardous organic liquids, mixtures of low-ash producing organics and metals, or organic matter with limited ash content and high metal content have been difficult to treat in the past, but can be processed with the controlled composition molten oxide pool embodiment of the invention. Wastes such as sludges containing primarily reduced metals may not be well suited for processing in joule heated glass tanks due to the high electrical conductivity of the resultant melt. However, using the controlled composition oxide pool mode of operation, such melts can be processed with molten metal baths below a molten oxide pool.

The tunable molten oxide pool arc plasmajoule heated melter process allows for the efficient conversion of automobile and truck tires (as well as other vehicle tires) into a low to medium BTU gas. The process does not require dissection or disassembly of the tires prior to treatment and any metal present after treatment can be separated in a liquid-metal phase positioned below the oxide melt layer.

The molten oxide pool can be formed using melt modifier materials, i.e. materials other than the primary waste material being treated. These melt modifier materials provide the desired medium for effective implementation and use of the tunable arc plasma-joule heated melter portion of the system. Melt modifiers can also be provided in combination with additional waste, or secondary waste, having desirable glassification characteristics. While not to be construed as limiting, suitable melt modifiers include glass forming constituents such as dolomite ($CaCO_3 \cdot MgCO_3$), limestone (e.g. calcium carbonate, $CaCO_3$), sand, glass frit, anhydrous sodium carbonate (i.e. soda ash), and combinations thereof.

Steam and/or controlled quantities of air may be introduced into the molten pool to facilitate the use of a water-gas reaction, thereby transforming carbon present in carbonaceous materials into hydrogen-rich gas. The hydrogen-rich gas produced by the system can be cleaned and then combusted in a gas turbine or internal combustion engine and subsequently used to produce electricity in a generator. In preferred embodiments, the waste heat from the gas turbine or internal combustion engine can be used to produce steam for the water-gas reaction in the melter unit.

For certain wastes, it may be desirable to operate the furnace plenum under oxidizing conditions. This situation may occur if it is determined that the waste form redox state must be higher to ensure a stable waste form or where energy recovery is not desired or practical. In cases where oxidizing melts are desirable or necessary, the furnace system therefore has the capability to operate under fully oxidizing conditions.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the Preferred Embodiments.

BRIEF DESCRIPTION OF THE DRAWINGS

For a fuller understanding of the present invention, reference is had to the following description taken in conjunction with the accompanying drawings, in which.

Similar reference characters refer to similar parts throughout the several views of the drawings.

DETAILED DESCRIPTION OF THE PREFERRED EMBODIMENTS

Figure 1A:
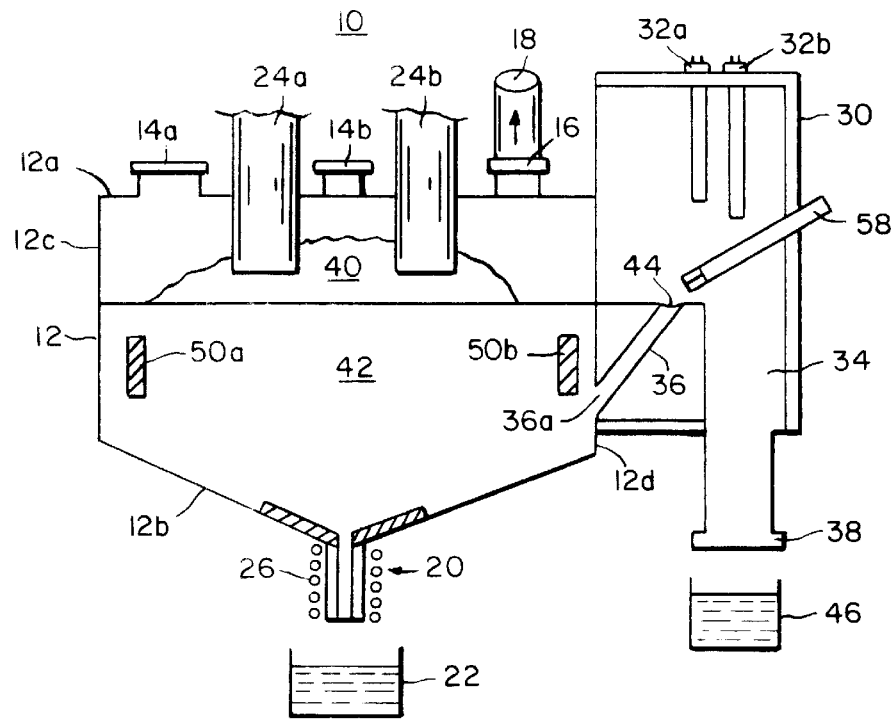
FIG. 1(a) shows a preferred embodiment of the arc plasma furnace and joule heated melter according to the present invention in which the furnace and melter are formed as a fully integrated system with a common molten bath.

The fully integrated plasma-melter systems in accordance with the present invention provide the advantage of having continuously tunable proportions of power between the arc plasma and joule heating portions of the unit. For example, the continuously tunable independent powering capabilities are useful when it is desirable to utilize one portion of the system independent of the other portion of the system, e.g. utilizing independently adjustable current magnitudes for the arc plasma or the joule heated portions of the melter. The continuously tunable independent powering capabilities provide robustness and facilitate ease of operation under changing conditions. The continuously tunable independent powering capabilities additionally improve efficiency and maximize environmental attractiveness by providing additional control over solid waste products, e.g. glass and off-gas generation.

Continuously tunable independent operation of the arc plasma and melter allows the use of various combinations and types of heating to be employed. For example, the arc plasma (or plasmas) provides radiative surface heating and internal bath heating. Large amounts of plasma power may be used at the initiation of waste feeding. Somewhat lower, but still substantial amounts of plasma power may be used during continuous feeding. High surface waste temperature heating facilitates high throughput processing as well as rapid pyrolysis to produce high quality, combustible gas. High surface heating may also be needed for processing where the material is difficult to melt or where the material is highly conductive, circumstances in which the effectiveness of joule heating could be reduced in the absence of arc plasma heating.

Joule heating in a glass melter using joule heating electrodes provides deep, volumetric heating. This type of heating ensures production of high quality glass by also promoting mixing in the entire melt pool. It also provides conductive material for more stable transfer arc operation. Independent use of volumetric heating may also be utilized to maintain the waste in a molten state at low power requirements when there is no waste material being fed and/or when no DC arc is being used.

Prior art techniques which use plasma heating alone can result in adverse effects such as excessive volatilization of material and thermal stressing of the furnace walls. In contrast, the continuously tunable independent powering of plasma heating and joule heating provided by the present invention overcomes these disadvantages and facilitates the use of additional volumetric heating for glass pouring and improved glass production without such adverse effects.

The tunable features of the integrated plasma melter unit may also be used to optimize processing of different types of waste streams. For example, dry municipal waste streams may generally require lower relative amounts of plasma power than would streams containing high melting temperature materials and larger amounts of metals such as hazardous and industrial wastes composed largely of inorganic substances.

As discussed herein, the use of volumetric melter heating also facilitates a greater range of options for plasma electrode configurations. Because volumetric melter heating maintains material in a substantially molten and conductive state, one or more arc plasma electrodes may readily be utilized. This is in part due to the molten material providing a conducting path between surface electrodes and/or to submerged electrodes. It is thus readily possible to continuously tune furnace operation by using one or more plasma arc electrodes. The increased flexibility in electrode configuration may be used to increase flexibility of waste feed and slag tapping capabilities, increase specific processing rates, optimize production of combustible gas, minimize particulate emission and reduce electrode wear.

Continuously tunable independent powering of the plasma and melter heating systems thus provides a greatly expanded amount of temperature control. Spatial and temporal control of temperature which has not been previously available may be used to improve the practicality and environmental attractiveness of combined arc plasma and melter vitrification systems relative to systems employing a plasma torch, only an electric arc or only joule heating.

Exemplary tunable arc plasma-joule heated melter systems are shown in FIGS. 1(a)–1(d). As discussed in greater detail herein, the DC arc and the AC joule heated electrical systems are fully integrated and operated simultaneously in a single glass melt, but are isolated electrically from one another through the use of special power delivery circuits. The arc plasma-melter combination units are thus both thermally and electrically integrated. In particular, the circuits allow passage of AC power through the melt using submerged electrodes as in standard conventional joule heated melters, but with tunable feed back control. The systems also allow simultaneous operation of a DC arc plasma circuit through the melt between upper movable electrodes or, if desired, between these electrodes and/or a submerged counter electrode(s). The type of waste and the character of the molten slag will determine the preferred operating mode and configuration of the system.

The integrated arc plasma-melter unit 10, shown in FIGS. 1(a)–1(d), includes reaction vessel 12 having top 12a, bottom 12b, and sides 12c and 12d. Bottom 12b may have a generally V-shaped configuration as also illustrated in FIGS. 1(a)–1(d). Reaction vessel 12 further includes at least one port or opening 14a through which waste material 40 is introduced into reaction vessel 12. In a preferred embodiment, reaction vessel 12 includes a plurality of ports or openings 14a and 14b as shown in FIGS. 1(a)–91(d). Ports 14a and 14b may include a flow control valve or the like to control the flow of waste material 40 into vessel 12 and to prevent air from entering vessel 12 therethrough. It is also preferred that such ports 14a and 14b include control mechanisms such that one or more of the ports can be selectively utilized, e.g. separately or simultaneously with one or another.

Reaction vessel 12 also includes gas port or opening 16 and metal/slag pouring port or opening 20. Gas exiting from port 16 preferably will enter conduit 18 and will be sent to a scrubber, turbine or the like for further processing. Port 16 may be provided with a flow control valve or the like so that gas formed in reaction vessel 12 may be selectively released into conduit 18. Metal/slag port 20 is designed to have a flow control valve or the like so that metal and/or slag may be removed and introduced into metal/slag collector 22 at predetermined rates and periods of time during the process. Additional or alternative valves or flow regulatory devices may be provided to further control metal and/or slag flow. When hazardous waste is being processed, it may be desirable to have collector 22 sealably connected to port 20 such that air and/or gases do not enter or exit the system therethrough.

As discussed herein, metal port 20 may be positioned to protrude through the bottom of unit 12 and elevated a predetermined distance thereabove. In this manner, port 20 may function as a submerged counter electrode to arc plasma electrode 24 or electrodes 24a and 24b. Port 20 may also be provided with inductive heating coils 26 to provide additional heating when it is desirable to pour metal and/or slag. Inductive heating coils 26 may also be designed to provide cooling when it is desirable to cease pouring metal and/or slag.

Unit 10 may also include auxiliary heater 30 to assist in glass tapping or pouring. Due to differences in specific gravity, metal in metal/slag layer 42 moves toward bottom 12b in vessel 12. Slag in metal/slag layer 42 exits through opening or port 36a into conduit 36. Conduit 36 may be formed of a conductive material, such as silicon carbide, to facilitate the flow of slag 44 therethrough. Alternatively or in addition to being formed of a conductive material, conduit 36 may be connected to a power supply and provided with heating coils (not shown) to ensure that the temperature of slag 44 flowing therethrough is sufficient.

As shown in FIGS. 1(a)–1(d), slag conduit 36 is preferably positioned such that slag 44 exits unit 12 and flows in an upward direction. It is also preferred that the end of slag conduit 36 adjacent unit 12 be positioned at a level above the bottom of unit 12 and that the opposite end of conduit 36 be positioned at a level at or below the level of the molten pool in the unit 12 (see FIGS. 1(a)–1(d)).

The temperature of slag 44 is maintained in chamber 30 by heaters 32a and 32b for a time and under conditions sufficient to provide a fluid glass or slag to pour into slag collector 46. Ohmic heaters are suitable for use as heaters 32a and 32b in chamber 30. Heaters 32a and 32b may be constructed of silicon carbide or the like. Alternatively or in addition to heaters 32a and 32b, the temperature of slag 44 may be maintained by plasma torch 58. Slag 44 then passes through slag pouring conduit 34 and port 38, thereby exiting chamber 30 into slag collector 46. When hazardous waste is being processed, it may be desirable to have collector 46 sealably connected to port 38 such that air and/or gases do not enter or exit the system therethrough.

Reaction vessel 12 also includes a plurality of AC joule heating electrodes 50a and 50b. As further shown in FIG. 1(a), electrodes 50a and 50b may be positioned across from one another on sides 12c and 12d, respectively. In addition, electrodes 50a–50b are positioned so as to be partially or totally submerged in the slag 42 mix when the process is in use. The positioning of electrodes 50a–50b can be varied according to the type and volume of waste being processed. When the waste feed material has a high metals content for example, the joule heating electrodes may be raised or lowered in the unit to adjust or "tune" the effective resistive path between electrodes. This may be desirable or necessary if the metal layer is allowed to increase to a point where the electrical path between the joule heated electrodes is effectively "shorted" due to contact or near contact with the highly conductive metal layer. In addition, the number of joule heating electrodes can be varied depending on the type and amount of waste material being processed (see FIGS. 4(a)–4(d)).

It should be appreciated that the joule heated melter facilitates production of a high quality pyrolysis gas using the minimum energy input to the process. This is accomplished because energy input to the arc does not need to be greater than that required to pyrolyze and melt the material in the arc zone. The molten bath below the unmelted feed material is maintained at the desired temperature using joule heating as opposed to using only an arc as in an arc plasma furnace. Air/oxygen and/or a combination of air and/or steam may be added to eliminate char from the melt surface and adjust the redox state of the glass. The joule heated melter provides energy (i.e. hot glass) near the sides of the bath where the gas/steam mixture is introduced.

Figure 1B:
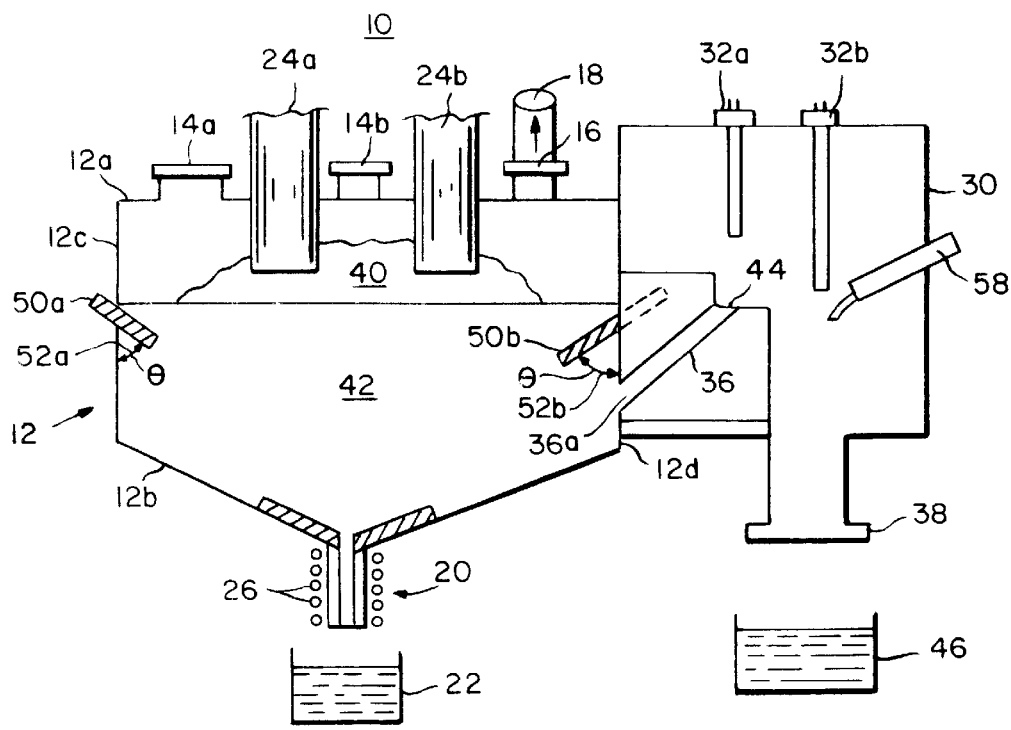
FIG. 1(b) shows a fully integrated arc plasma furnace and melter in which the melter portion electrodes are positioned at an angle relative to the vertical portion of the arc plasma-melter unit.

FIG. 1(b) illustrates an alternative arrangement for the positioning of electrodes 50a and 50b in accordance with the present invention. This arrangement facilitates replacement of the electrodes by eliminating the need to drain the furnace hearth prior to replacement. Draining the furnace hearth is undesirable as it may degrade the lining of the furnace. Positioning electrodes 50a and 50b at angles 52a and 52b respectively, while simultaneously preventing the escape or release of gas facilitates the replacement of electrodes as needed. While not to be construed as limiting, angles 52a and 52b of electrodes 50a and 50b relative to the respective interior sides of the furnace are preferably between about 0°–45°. It may also be desirable to utilize metallic electrodes or graphite electrodes for the joule heated melter.

As further shown in FIG. 1(b), AC powered joule heating electrodes 50(a) and 50(b) can be inserted through sides 12c and 12d or through top 12a of furnace 12, respectively. The top end of each electrode preferably extends outside the metallic furnace enclosure and may be capped with an electrical connection that will be electrically insulated from the electrically grounded furnace shell. The bottom end of each electrode is immersed beneath the molten bath to a desired depth. By selecting the proper location for the point of entry of the electrode below the surface of the melt 42, no portion of the electrode will be exposed to the DC arc or radiation from this arc, thereby increasing the life of these electrodes.

When it is necessary to replace electrode 50a and/or 50b, the spent electrode is withdrawn from the molten bath. If a new electrode is inserted into the bath without preheating the electrode, the cold electrode may cause the viscosity of the molten bath to increase where the electrode contacts the molten bath, thereby making it difficult to insert the new electrode into the molten bath. It may be thus desirable to electrically energize the electrode by using a current limited power supply that will safely provide additional heat at the junction of the bath and the electrode to readily permit immersing the new electrode into the bath. In a preferred embodiment, suitable electrical and thermal insulation may also be provided to each electrode so that each electrode will be insulated both thermally and electrically from the metallic furnace enclosure during normal operation.

Figure 1C:
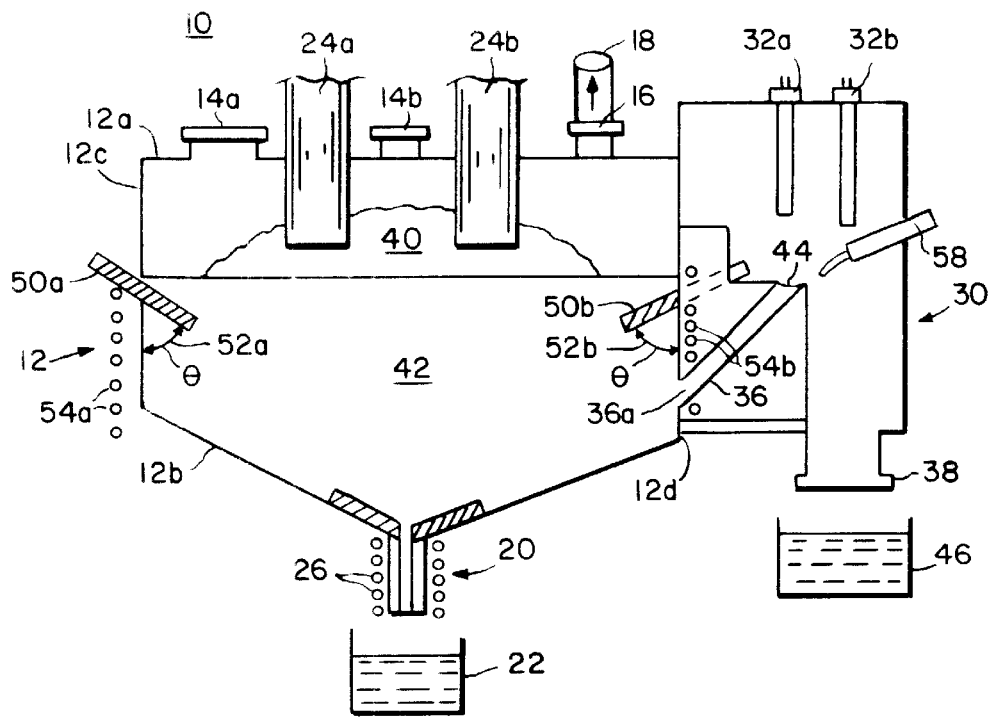
FIG. 1(c) shows the fully integrated system of FIG. 1(b) with magnetic coils for inductive heating and mixing in accordance with the present invention.
Figure 1D:
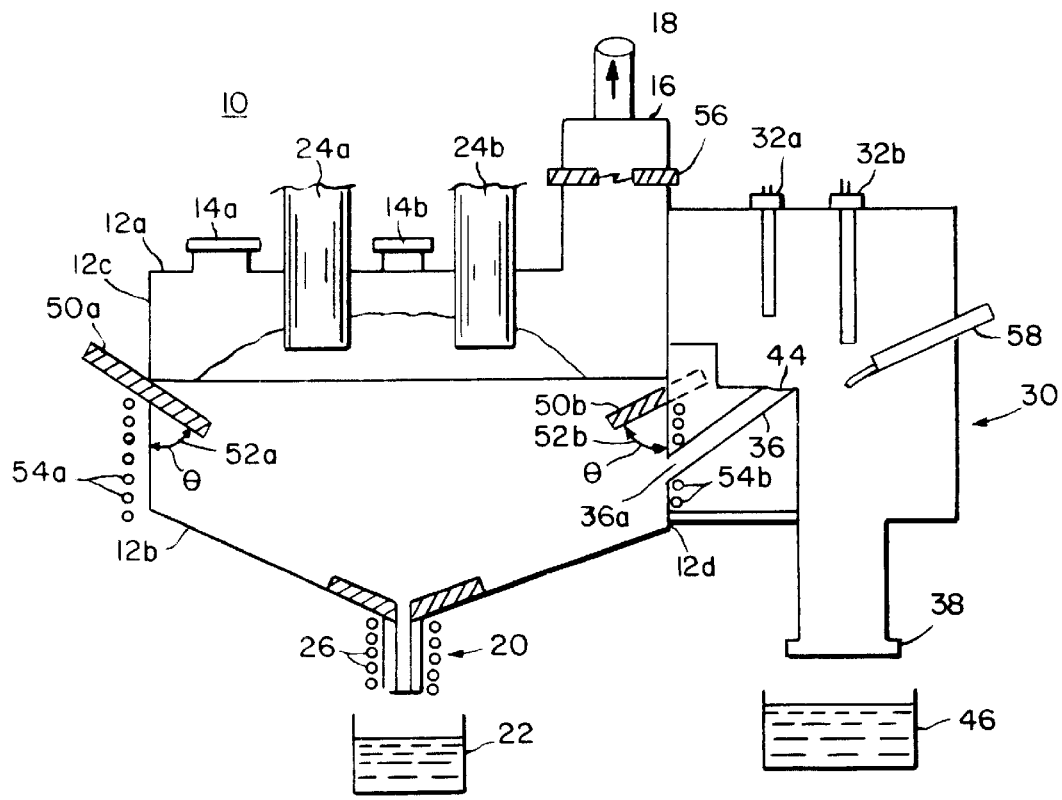
FIG. 1(d) illustrates the fully integrated system of FIG. 1(b) having a secondary thermal boost system in accordance with an alternative embodiment of the invention.

FIG. 1(c) illustrates another embodiment of the invention in which magnetic coils 54a and 54b may be utilized for inductive heating and/or mixing. In order to provide the optimum rate of melting commensurate with a particular waste stream being introduced into the combined DC arc plasma-melter unit, additional stirring or mixing beyond that normally produced by the melter portion of the furnace and the DC arc portion of the furnace may be desirable. This may be accomplished by the addition of strategically placed magnetic coils such as coils 54a and 54b to create greater J×B forces which in turn causes additional mixing and/or heating in the molten bath. Coils 54a and 54b may be positioned within the metal shell of the furnace, but behind the refractory lining of the melt pool. Alternatively, if the furnace shell is fabricated of non-magnetic stainless steel such as 304L or 316 grade, the coils may be placed on the exterior of the shell. Coils 54*a* and 54*b* are connected to an AC power supply source. The frequency of the power supply source may vary depending on the material. This enhancement of bath mixing is an example of the type of "tuning" which may increase furnace electrode life and waste throughput according to the present invention.

The same features of tunability of the mix of the surface and volume heating that apply to the use of a joule heated melter apply to the use of the inductively heated melter in conjunction with the plasma. For some types of waste processing, it may be desirable to operate with only arc plasma and inductive heating. A representative system of this embodiment would be the same as that illustrated in FIG. 1(*c*) without joule heating electrodes.

FIG. 1(*d*) illustrates another embodiment of the present invention that incorporates a secondary thermal boost system 56. Conversion of waste to electrical energy for the plasma melter process depends on maximum conversion of solid and liquid wastes to gaseous products. In pyrolysis processes, a portion of the exiting gas may contain condensables that are light to medium weight oils or other condensable materials. If the gas exiting the primary plasma-melter chamber is allowed to cool, liquefaction or condensation of a portion of the off-gas may result due to the condensables present at furnace temperatures. Secondary plasma off-gas chamber 56 ensures that these oils are converted to noncondensable combustible materials resulting in an enhanced recovery of energy value from the incoming waste materials.

Secondary thermal boost system 56 may be placed proximate to or within port 16. This system may include heating elements or an arc plasma in a chamber to provide the desirable or necessary thermal energy to further crack and reform condensable fractions exiting the primary plasma-melter unit. When secondary plasma chamber 56 is positioned as shown in FIG. 1(*d*), the gas exiting the primary furnace chamber does not significantly decrease in temperature before entering the secondary plasma chamber 56 because the two systems are directly coupled. This minimizes the overall energy requirements for the cracking and gasification processes.

Because substantially all condensable species exiting the furnace are converted to a combustible gas in the secondary plasma chamber, secondary waste generation is minimized. It will be appreciated by those skilled in the art that the plasma off-gas chamber may not always be required, but if installed, it may be independently controlled during the process.

Graphite is the preferred arc transfer electrode material rather than copper as used in plasma arc torches. Graphite electrodes have much higher current capability than copper electrodes and do not require water cooling. It should be appreciated, however, that other metallic elements such as molybdenum, tungsten or the like may be utilized as electrode materials for particular applications. Electrode(s) 24 may be positioned at any angle so long as they are positioned on an interior face of the hearth. The portion of the electrode length just above the bottom of the electrode may be coated to decrease the rate of erosion.

Figure 2:
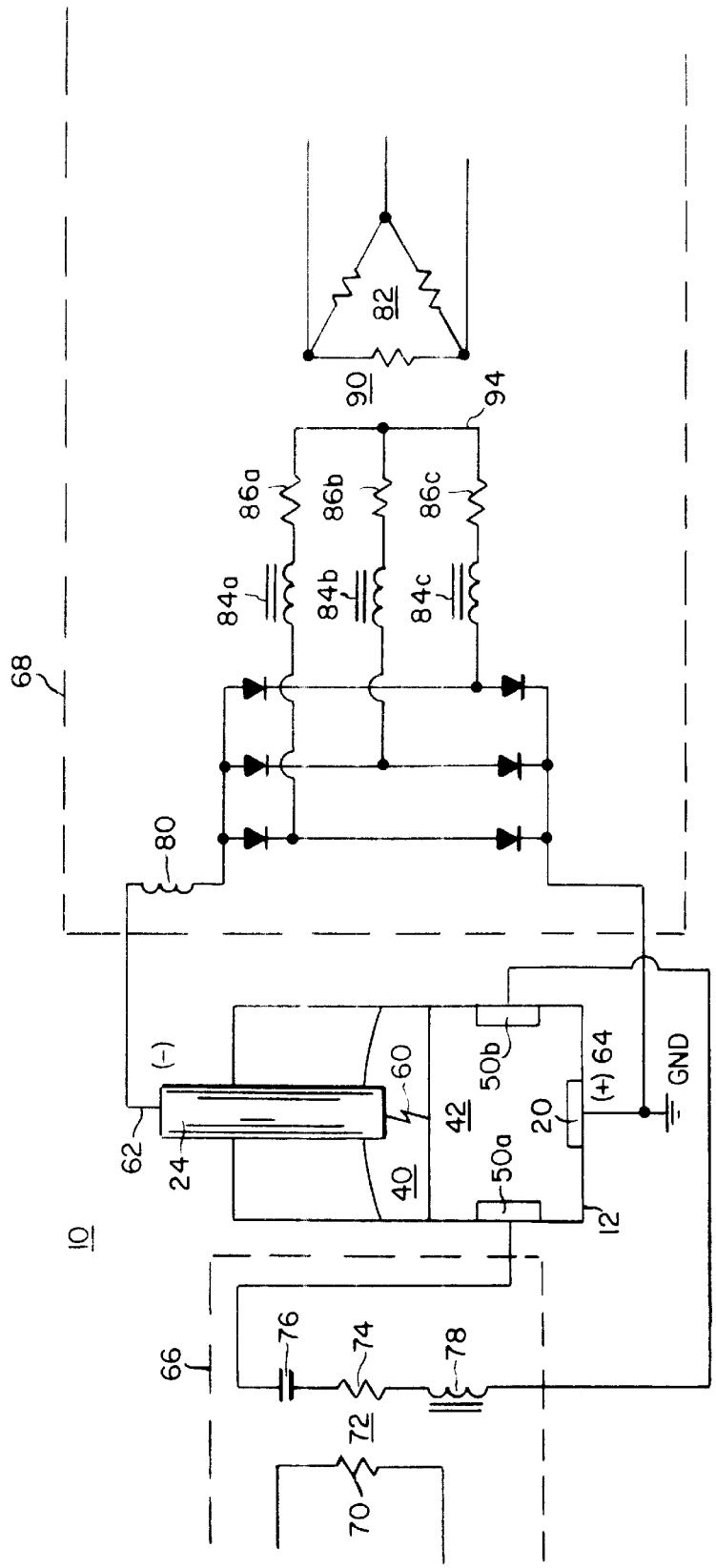
FIG. 2 illustrates a fully integrated arc plasma furnace and joule heated melter system with independently controllable power delivery systems.

As shown in FIG. 2, electrode 24 supplies arc 60 which contacts feed material 40. One or more additional electrodes 20 may be provided as shown in FIGS. 1 or 2 such that negative (−) 62 and positive (+) 64 outputs are formed thereby. When unit 12 is operated with one arcing electrode 24 and one submerged electrode 20, it is preferred that the (−) electrode is electrode 24 and the (+) electrode is electrode 20. This arrangement reduces the consumption of the graphite electrode.

One configuration of integrated system 10 involves the use of capacitors 76 and a specific arrangement for the distribution of power. As further shown in FIG. 2, a single phase joule heated arc plasma-melter 12 having a single pair of electrodes 24 and 20 is illustrated. Preferably, the joule heated portion of melter 12 utilizes AC power supply 66 while the arc portion of melter 12 utilizes DC power supply 68.

The embodiment shown in FIG. 2 utilizes a combination of the DC and AC power systems 68, 66 respectively, to supply power to the electrodes in unit 12 in which waste material 40 is undergoing treatment by a conversion process, including vitrification. A unique circuit is necessary because DC arc current 24, 20 will interact with joule heating AC electrodes 50*a*, 50*b* unless steps are taken to prevent such interaction and to prevent failure of the transformers which provide power to the joule heating electrodes. This circuit allows fully independent control of the arc plasma and joule heated potions of the melter.

If single-phase, two-phase, or three-phase AC arcing electrodes are utilized instead of DC arcing electrodes, there may still be interaction between the AC arc circuit and the joule heating AC circuit. While the AC-AC interaction is quite complex, there are many dependent interactions which can occur, and under these circumstances, it is often difficult to control localized heating and electrode erosion. Accordingly, it is preferred to utilize a DC arc circuit in combination with a joule heated AC circuit.

DC power supply 68 includes inductor 80, primary winding 82 of transformer 90, secondary windings 86*a*, 86*b* and 86*c* and saturable reactors 84*a*, 84*b* and 84*c*. Primary winding 82 is preferably delta. Saturable reactors 84*a*, 84*b* and 84*c* are connected in series respectively with secondary windings 86*a*, 86*b* and 86*c*.

If DC current from power supply 68 passes through waste material 40 and slag/metal melt pool 42 having submerged joule heating AC electrodes 50*a*, 50*b* connected directly to the terminals of transformer 72 with no means of blocking the flow of DC current from power supply 68 through the secondary windings of transformer 72, the core of transformer 72 saturates. This results in increased current in primary winding 70 of transformer 72 causing transformer 72 to fail in a very short time period. In order to simultaneously operate the arc plasma and the joule heated melter in vessel 12, it therefore is necessary to continue to pass AC current 66 through melt pool 42 for joule heating, while simultaneously blocking DC current flow 68. Capacitor 76 is utilized to block DC current 68 and pass AC current 66. Capacitor 76 preferably is connected in series with each transformer secondary winding 74 in order to block the flow of DC current in any or all of the secondary windings. As further shown in FIG. 2, capacitor 76 is connected to secondary winding 74, which is connected to saturable reactor 78.

FIGS. 3(*a*) and 3(*b*) show a circuit arrangement which is suitable for use in the present invention. In particular, three-phase AC power supply 66 is illustrated in FIG. 3(*a*) while DC power supply 68 is illustrated in FIG. 3(*b*). The circuit includes the inductance of each AC current path in vessel or melter 12 as reflected through the entire AC power system 66, the non-linear resistance of the current path through melt pool or molten bath 42, the electrode interfaces, the power feed cables, secondary windings 74a, 74b and 74c of transformer 72 and the magnitude of the capacitance of capacitors 76a, 76b and 76c which is connected as a series element in the joule heating furnace circuit. AC power supply 66 also includes primary winding 70, saturable reactors 78a, 78b and 78c and electrodes 50a–50f. Saturable reactors 78a–78c are connected respectively to secondary windings 74a–74c.

Because the AC current is rarely sinusoidal in a circuit having in series with a non-linear resistor such as the joule heating furnace circuit, it is possible to excite several harmonic or subharmonic frequencies other than 60 Hertz, which are superimposed on the 60 Hertz sine wave supplied by the utility company. In this circuit, it is important to account for the non-linear resistance and to specify the electrical components to achieve adequate damping and therefore stable operation. It is also important that the voltage, current, and capacitance ratings of the capacitor are such that the series resonant frequency of the entire system inductance at the furnace electrodes is such that the lowest value of resistance as seen at these same electrodes when looking into the furnace plus the effective 60 Hertz resistance is equal to or greater than 1.5 and preferably 2 times greater than the $(L/C)^{1/2}$ where L is the total inductance of the power system and C is the capacitance of capacitors 76a, 76b and 76c. The total effective resistance R should be 2 times $(L/C)^{1/2}$, but any resonant rise in current is negligible if R is 1.5 times $(L/C)^{1/2}$.

Figure 3A:
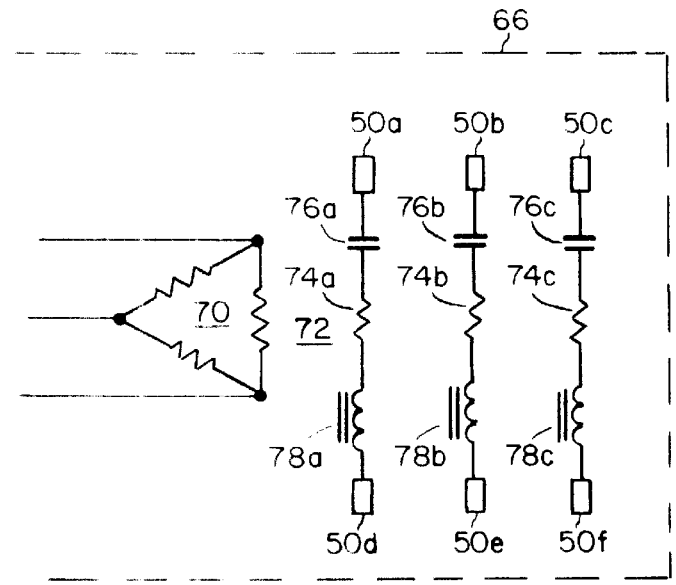
FIGS. 3(a) and 3(b) respectively show an AC power system and a DC power system for use in accordance with the present invention.
Figure 3B:
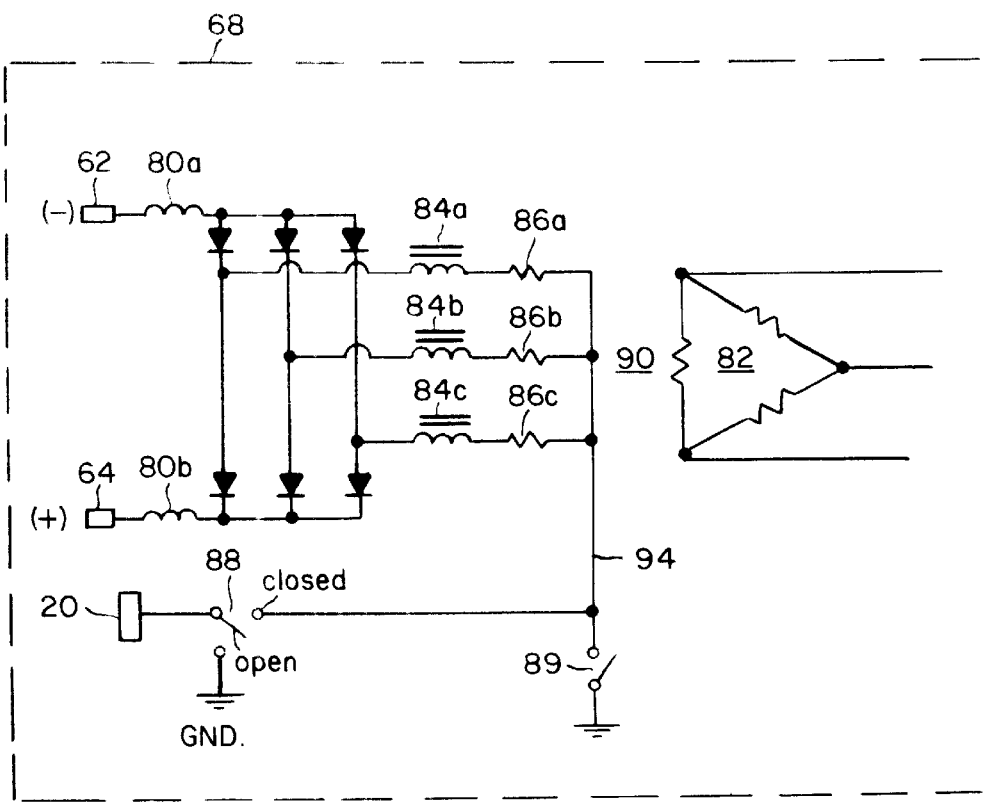

As shown in FIG. 3(b), DC electrical system 68 may have a power transformer 90 with wye or delta secondary windings 86a–86c. Primary winding 82 is preferably delta. As also shown in FIG. 3(b), the power rectifier is preferably a three-phase full wave rectifier. The rectifier may be a current controlled thyristor rectifier as shown in FIG. 3(a) of copending U.S. application Ser. No. 08/492,429, filed Jun. 19, 1995 (i.e., a silicon-controlled rectifier in which the anode-cathode current is controlled by a signal applied to a third electrode). Alternatively, the rectifier may be three-phase full wave diode rectifier with the DC current control to maintain the desired DC current such as that illustrated in FIG. 3(b) of copending U.S. application Ser. No. 08/492,429, filed Jun. 19, 1995. If a thyristor rectifier is utilized, a full-rated current clamping diode is placed across DC output terminals 62 and 64. It is not necessary to add a DC "floating" or "clamping" diode when using a three-phase diode rectifier since the diodes in the rectifier will frequently suffice.

For a DC arc furnace, it may be preferable to use a three-phase full wave diode rectifier with saturable reactor control 84a–84c. Regardless of which type of power supply is used, it is important that an inductor is connected in series with the DC power lead which is not grounded. This reactor is necessary to rapidly supply the energy when the furnace conditions are such that the DC arc voltage suddenly increases.

If the bottom of the inside of furnace or melter 12 is made of suitable refractory such as ceramic or the like and is a poor electrical conductor when hot, counter electrode 20 may be formed by depressing a portion of the floor of furnace 12 between joule heating electrodes 50a–50f and/or slightly elevating the molten metal drain tube 20 so that a pool of metal remains in this depression in the furnace floor even after the metal is drained. This metal may act as a counter electrode 20 for the AC joule heating circuit and may simultaneously be used as a DC arc circuit electrode.

Electrically conductive furnace bottom electrode 20 may be connected using various configurations such as that shown by the circuit diagram in FIG. 3(b). In any case, it is preferred to have one or more electrodes through the bottom of the furnace or melter. The electrodes may be graphite or metal. It should be noted that the circuits in FIG. 3(b) and FIG. 5 respectively include switches 88 and 96 in series with the electrical connection to counter electrode 20. The function of these switches is to permit the DC arc or arcs to operate in the transfer mode. When a switch is "open" for example, there will be an arc from the (+) electrode to the bath and an arc from the bath to the (−) electrode. When a switch is "closed", there will be an arc from the (+) electrode to the bath and then to the counter electrode, and there will be an arc from the counter electrode through the bath and then to the (−) electrode.

Switch 88 is a three position switch, having closed, open and ground positions. Transformer neutral grounding switch 88 will permit several modes of operation. When unit 12 is operated in a mode in which the two DC arcs are electrically connected in series through molten bath 42, switch 88 will be in the "ground" position and single throw ground switch 89 will be "open". When unit 12 is operated in the mode where two DC arc electrodes operate independently, then switch 88 is in the "closed" position and single position switch 89 will be in the "ground" position. The "open" position of switch 88 may be used during system maintenance (or when joule heating is used without arc plasma if heating).

If the physical configuration of furnace 12 (shown in FIG. 1–2) is suitable for utilizing two independently positioned controllable electrodes, then the DC arc electrodes and the AC joule heating electrodes may be operated simultaneously without detrimental electrical interaction. In addition, beneficial interaction for vitrification of all types of waste, including hazardous wastes and hospital waste can be obtained.

Figure 4A:
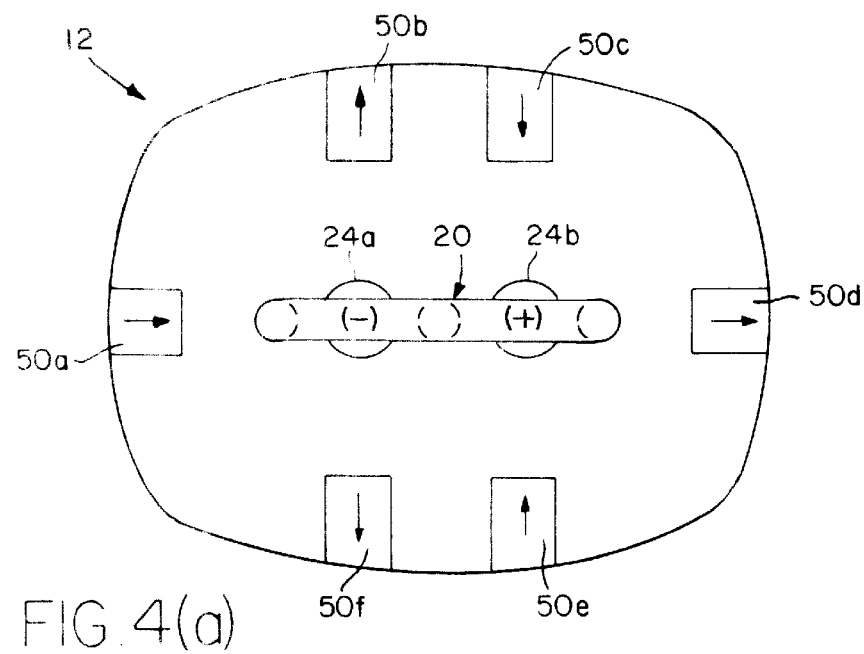
FIGS. 4(a)–4(d) show plan views for electrode configurations and geometries for use in accordance with the present invention.
Figure 4B:
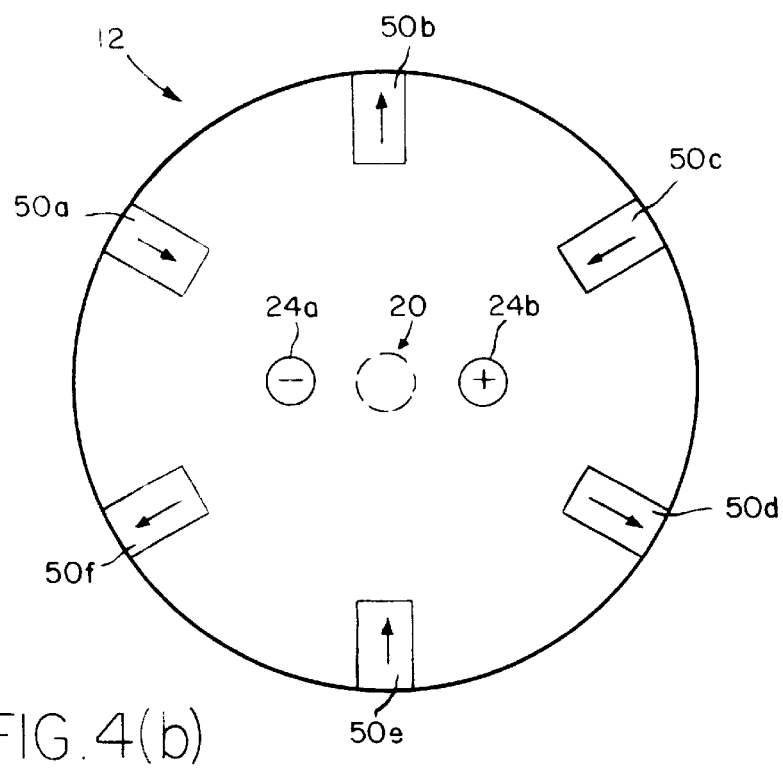
Figure 4C:
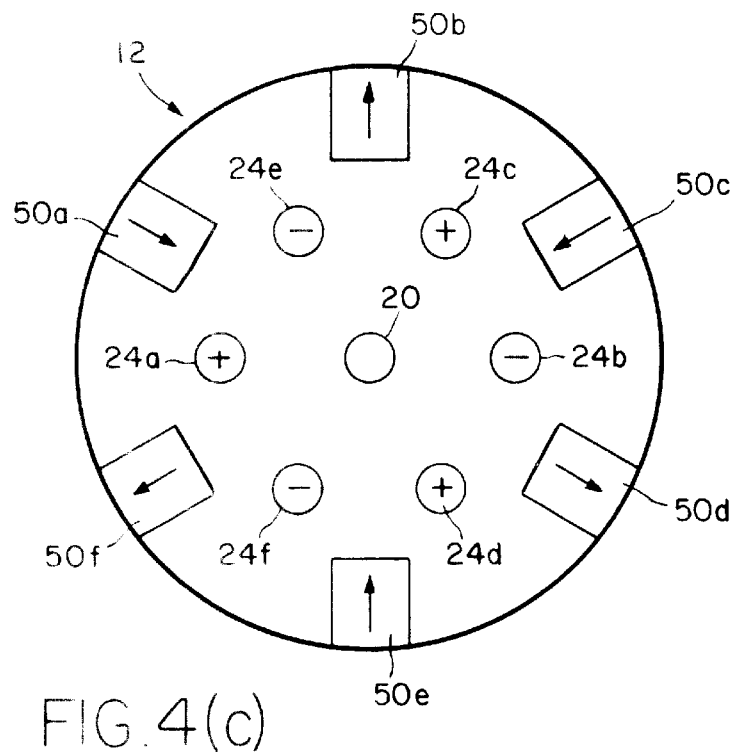

Exemplary plan views for various electrode configurations (and relative direction of current flow) suitable for use in unit 12 are shown in FIGS. 4(a)–4(d). These configurations are suitable for remote control installations. FIG. 4(a) shows an elongated furnace construction while FIG. 4(b) shows a round furnace construction. While both configurations can use one or more solid graphite electrodes, it may be preferred to use the elongated configuration with two electrodes (as shown in FIG. 4(a)) in some circumstances since this design lends itself to two separate small diameter electrode elevating systems, each housed in a metallic gas tight enclosure. In smaller furnaces, configurations such as that shown in FIG. 4(a) may be preferred over FIG. 4(b).

Any or all of the joule heating electrodes (50a, 50e or 50c) or (50d, 50b or 50f) can be connected as counter electrode 20 for the DC arc system. The electrode configuration illustrated in FIG. 4(b) utilizes one three-phase AC joule heating power supply and one DC rectifier power supply. In an alternative embodiment, shown in FIG. 4(c), six joule heating electrodes 50a–50f are employed with six arc electrodes 24a–24f. The configuration shown in FIG. 4(c) uses one three-phase AC joule heating power supply and three DC rectifier power supplies.

Figure 4D:
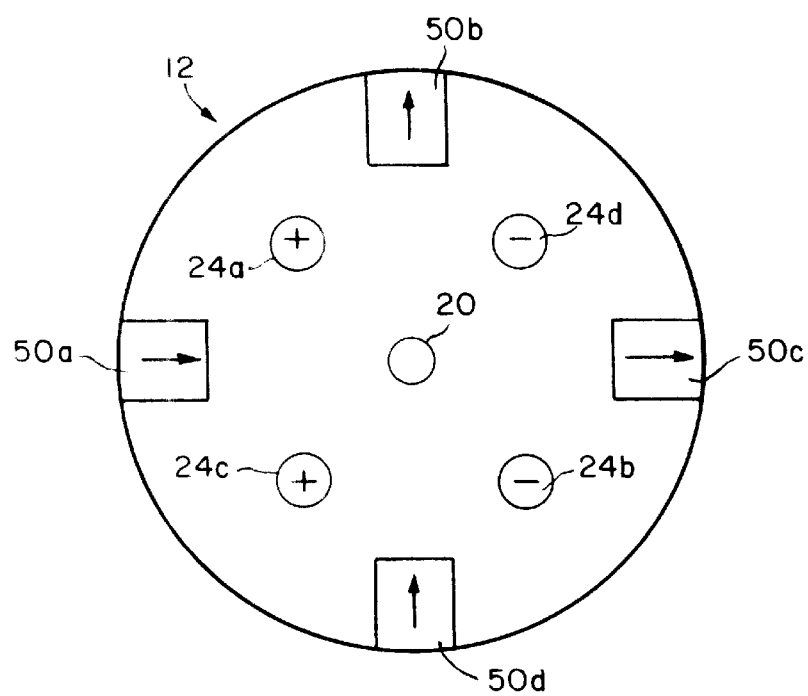

In another embodiment illustrated in FIG. 4(d), four joule heating electrodes 50a–50d are utilized with four arc electrodes 24a–24d. In this arrangement, two two-phase Scott T AC power and rectifier supplies are employed.

Figure 5:
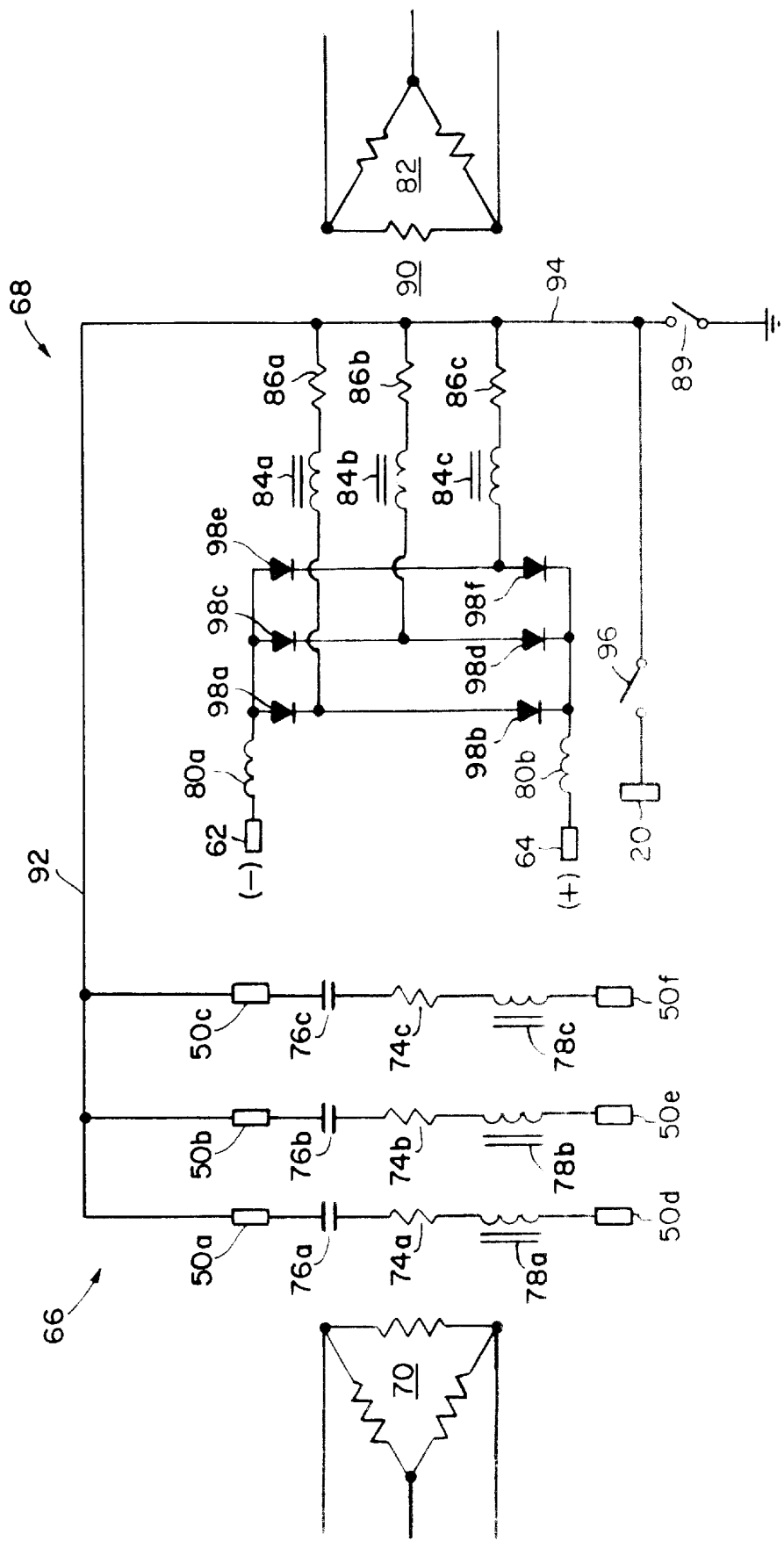
FIG. 5 illustrates a circuit diagram having the ability to connect a portion of the AC electrodes that will conduct both AC and DC according to the integrated system of the present invention.
Figure 6:
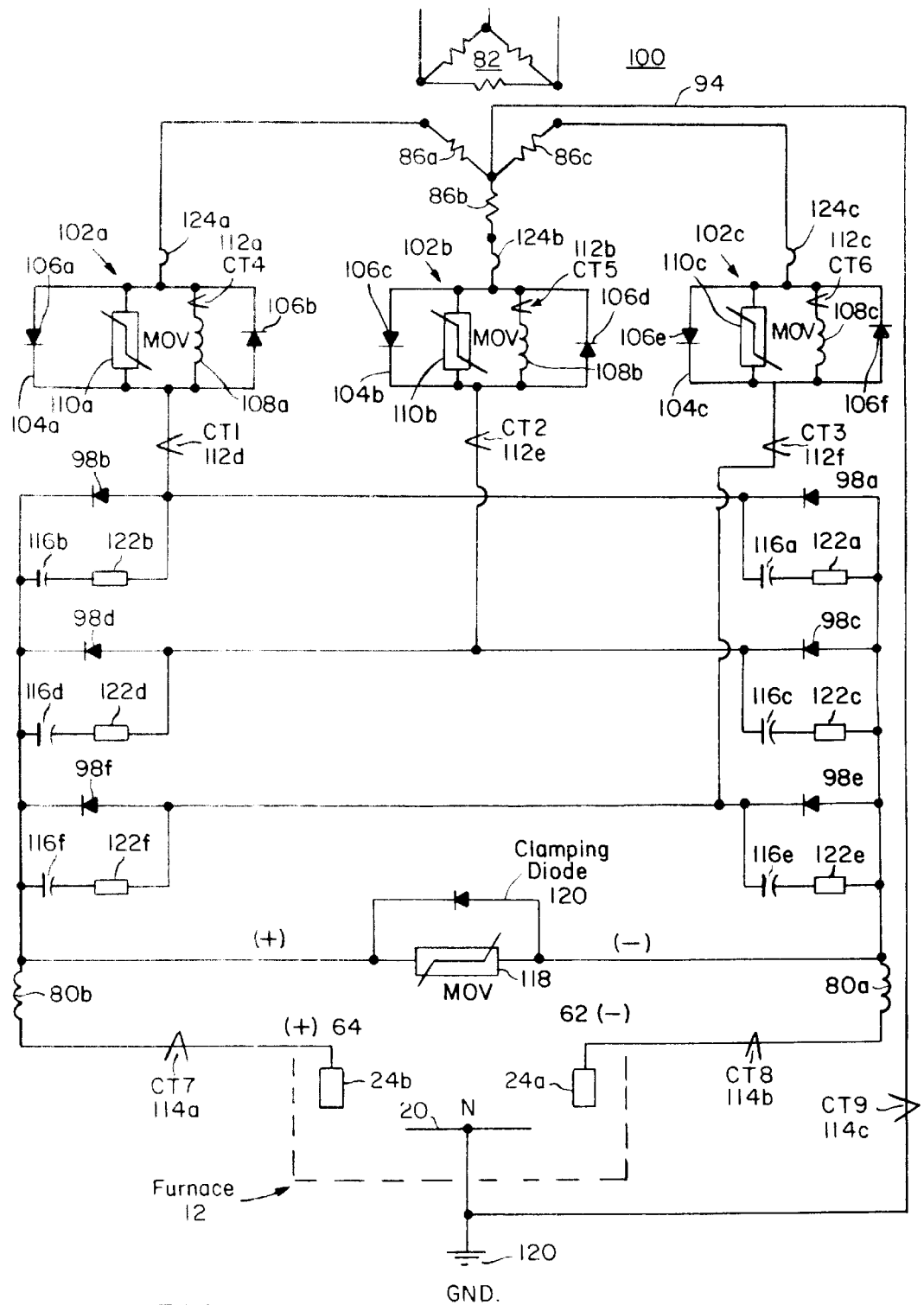
FIG. 6 illustrates an alternative circuit diagram suitable for use in the present invention.
Figure 7:
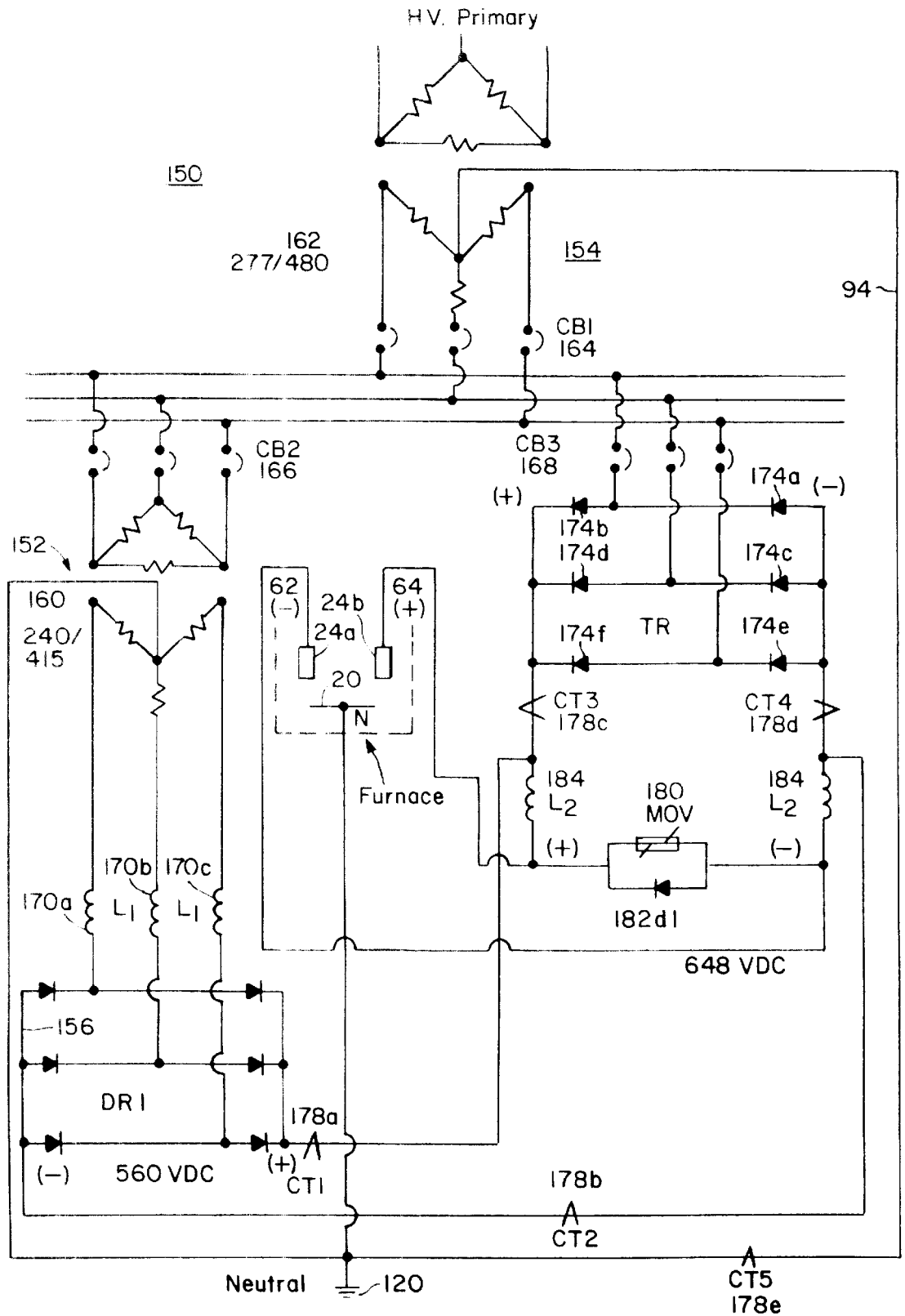
FIG. 7 illustrates another alternative circuit diagram suitable for use in the present invention.

As shown in FIG. 5, AC power supply system 66 includes primary winding 70, secondary windings 74a–74c connected respectively to saturable reactors 78a–78c (or thyristor switches as shown in FIGS. 6 and 7). DC power supply 68 includes inductors 80a, 80b and secondary windings 86a–86c connected respectively to saturable reactors 84a–84c. Depending upon the type of waste material being processed, it may be desirable to connect DC power supply 68 system neutral 94 to AC joule heating electrodes 50a, 50b and 50c, which are the electrodes connected to AC capacitors 76a–76c respectively and which are used to block DC current flow through the secondary windings 74a–74c of the transformers as also shown in FIG. 5. The connection of DC power supply 68 and AC power supply 66 is designated in FIG. 5 as line 92. The reason for using this connection is to provide three additional DC counter electrodes closer to the surface of melt pool 42 during warm up of the furnace so that neutral DC transfer current 94 can flow and assist in stabilizing the positive (+) and negative (−) DC arcs before the material directly above the counter electrode on the hearth has become sufficiently hot to conduct sufficient DC current to assist in stabilization of the DC arcs.

As discussed above, two or more DC arc plasma electrodes are preferably used to provide one or more arcs to or within the common molten pool. One electrode is in electrical contact with the (+) terminal of one DC inductor and another electrode is in electrical contact with the (−) terminal of another DC inductor. The mid or neutral terminal of the secondary winding of the rectifier transformer may or may not be electrically connected to a counter electrode which may be at or near the bottom of the molten pool.

If only one of the two DC electrodes is arcing and the other DC electrode is submerged in the molten bath and not arcing, then the submerged electrode could be grounded. However, it is not necessary and may not be desirable to do so.

Because the preferred system employs two graphite electrodes, one electrode (+) and the other (−), then the neutral junction 94 of the three wye connected windings of the three phase transformer may or may not be connected to ground 120 (see FIG. 6).

Graphite tapping spout 20 and the metal furnace shell of unit 12 must be grounded for safety reasons. Because the graphite tapping spout is in electrical contact with the molten pool in the bottom of the furnace, this means that if the neutral terminal 94 of the wye connected secondary winding is not connected to the graphite tapping spout 20, then the two arcs are electrically in series. If one of the arcs extinguishes, then both of the arcs will therefore extinguish and this is not desirable. By connecting the neutral point 94 to the graphite tapping spout 20, each arc is effectively independent and can continue to burn notwithstanding that the other arc has extinguished. Radiation from the arc which continues to burn frequently causes the extinguished arc to reignite.

By connecting the three isolated secondary windings as shown in FIG. 3(a) or FIG. 5 and being certain that phase 50(b)–50(e) is physically connected in reverse polarity to phase 50(a)–50(d) and phase 50(c)–50(f), then the current baths through the molten bath will be such as to cause stirring and mixing of the bath and thereby increase the quantity of waste material that can be processed per hour in a given furnace.

It should also be noted that if two or three independent DC power supplies of the type shown in FIGS. 3(b) and/or FIG. 5 are used to power four or six graphite arc electrodes, this will provide additional furnace design configuration opportunities when large quantities or physically large waste materials need to be processed. The round furnace designs shown in FIGS. 4(b)–4(d) would fulfill this requirement.

In alternative embodiments of the invention shown in FIGS. 6 and 7, two circuits are provided that include thyristors in place of the saturable reactors. While conventional circuits using thyristors are known, these circuits are subject to large gaps when they are phased back, resulting in less arc stability. The circuits provided by the present invention however are more precise, less expensive and can increase arc stability. These circuits may be advantageous over the circuit shown in FIG. 5 because saturable reactors are often larger and more expensive than thyristors. The circuits shown in FIGS. 6 and 7 utilize thyristors to provide the same desirable characteristics as the saturable reactors described hereinabove, e.g. to enhance arc stability in a DC arc furnace.

Circuit 100 shown in FIG. 6 includes three phase power controls 102a, 102b and 102c. Each phase power control 102a–102c includes a thyristor switch 104a–104c respectively. Switches 104a–104c each respectively include a pair of thyristors 106a–106f. Each thyristor switch 104a–104c can be bypassed by AC linear inductors 108a–108c, respectively. Metal oxide varistors (MOV) 110a–110c connected across the thyristors of static switches 104a–104c respectively, are used to limit or clamp any transient voltages of either polarity to a level which will not damage the thyristors.

Current transformers (CT) 112a–112f are standard AC current transformers. Current transformers 112a–112c ensure that an appropriate level of DC current is flowing between the (+) and (−) DC arc electrodes before the thyristors 106a–106f of thyristor switches 104a–104c are "turned on". Current transformers 112a–112c also ensure that if any thyristors are inadvertently "turned on", any resulting current will be rapidly reduced to a preset level of current. This will prevent the case of a DC power arc extinction, the "full phase on" of the thyristor switches which may produce an abnormally and undesirably high transient surge of DC current if the arcs through the (+) and (−) electrodes are initiated under a "full" phased on" condition.

AC linear inductors 108a–108c can limit the AC current to approximately 100 amperes RMS when the thyristors 106a–106f of thyristor switches 104a–104c are not pulsed or otherwise gated. This means that the DC current supplied by the three phase full wave diode rectifier will be on the order of 120 DC amperes if the graphite DC arc electrodes are short circuited and thyristors are not energized. When the (+) DC arc electrode 24b and (−) DC arc electrode 24a contact an electrically conductive surface, an arc or arcs may be initiated and sustained with a current magnitude less than 120 amperes prior to firing the thyristors. This decrease in current is due to the effective resistance of the arcs. When the thyristor gates are fired, the arc current through the electric arc or arcs will increase to a magnitude which is determined by the relative phase angle and duration of the pulse gate.

Additionally, the firing of the thyristor switches results in an increase in the arc current since their respective linear inductors 108a–108c will be short circuited. Because current can pass through inductors 108a–108c prior to being short circuited by thyristors 106a–106f, this means that energy can be stored in inductors 108a–108c. The amount of energy stored in each inductor is $E = \frac{1}{2} L i^2$ where E is the energy in watt seconds, L is the inductance in Henry's and i is the current in amperes.

The energy stored in the inductors can cause current to flow from inductors 108a–108c through the thyristors 106a–106f in a direction which is opposite to the current normally flowing from the transformers (112a–112c or 112d–112f) to the diode rectifier when thyristors 106a–106f are fired. It is therefore desirable to fire thyristors 106a–106f at such a time or phase angle so that the initial current through thyristors 104a–104c will be significantly greater than the magnitude of current flowing out of inductors 108a–108b. If before the thyristor gate is pulsed, the initial current from the inductor is greater than the forward current through the thyristor before gate "turn on" of the thyristor is completed, the thyristor may be momentarily "turned off". On the other hand, if the gate pulse is sufficiently long, then the thyristor will quickly "turn on" again and remain in the "turned on" condition until its normal power frequency "current zero" is reached, at which time it is necessary and desirable to have this thyristor "turned off".

The wye connected transformer neutral 94 is connected to ground 120 and also connected to a counter electrode 20 in the center of the furnace hearth. This further enhances arc stability under a variety of conditions which may otherwise cause arc instability or arc extinction.

Current transformers (CT) 112a–112f are standard AC current transformers and current transformers (CT) 114a–114c are DC type current transformers. Current transformers 112d, 112e, 112f, 114a and 114b provide feedback information to an automatic current control circuit to maintain essentially a constant preset amount of current under varying arc voltage conditions. Current transformer 114c senses any unequal current between the (+) arc electrode 24a and (−) arc electrode 24b and provides the signal to correct any undesirable current unbalance in the neutral circuit 94. Thus, Capacitors 116a–116f minimize the transient voltage across the diodes. Capacitors 116a–116f and resistors 122a–122f are known as snubber circuits. MOV 118 is used to decrease the magnitude of transient voltage which may appear across (+) and (−) DC rectifier terminals such that the current passes through clamping diode 120.

Referring now to FIG. 7, an alternative embodiment of the circuit shown in FIG. 6 is shown. The circuit 150 shown in FIG. 7, which is designed to accomplish the same objectives as the circuit shown in FIG. 6, includes two different power rectifier circuits 152, 154.

The "start up" rectifier circuit 152 includes a three phase diode rectifier 156 with an output current rating on the order of 10% of the main power rectifier 158 output current. In addition, the secondary voltage 160 of this "start up" rectifier transformer must be less than the secondary voltage 162 of the main power transformer. For example, if the secondary voltage 162 of the main power transformer is 277/480 volts, this circuit will deliver 648 volts DC. If the secondary voltage 160 of the "start up" rectifier transformer is 240/415 volts, then its DC voltage will be 560 volts. The difference in DC voltage permits the following sequence of events to take place during start up and normal furnace operation.

(+) DC electrode 24b and (−) DC electrode 24a can be placed in contact with an electrically conductive surface, such as molten pool 42. Circuit breakers 164 (CB1), 166 (CB2) and 168 (CB3) are closed such that DC current flows from diode rectifier 156 (DR1). The magnitude of this DC current is limited by the linear inductors 170a–170c ($L_1$) which deliver AC power to the AC input of diode rectifier 156 (DR1).

The gate firing circuit 156 is controlled so that during the above start steps there are no firing pulses delivered to the thyristors 174a–174f of thyristor rectifier 158. This means that thyristor rectifier 158 (TR) is not supplying any DC voltage or current to the (+) and (−) electrodes, 24b and 24a, respectively.

When firing pulses are delivered to thyristors 174a–174f in power rectifier 158 (TR), then its DC output voltage will increase until it exceeds the 560 volts DC from the "start up" rectifier. This power rectifier may then increase its current to a preset level and will maintain this preset level even though the resistance between the (+) and (−) electrodes may vary over a relatively wide range.

During the interval when none of the thyristors are "turned on" or "fired" by their respective gate pulses, the starting diode rectifier 156 (DR1) maintains a low current arc thereby producing and maintaining a stable DC arc or arcs.

In order to be sure that a large magnitude of transient current is not delivered between (+) to (−) or (+) to N or (−) to N because there was no previous arc or other current path between these electrodes and the control circuit does not recognize this open circuit condition, DC current transformers 178a (CT1), 178b (CT2), 178c (CT3) and 178d (CT4) sense this condition and cause the following to occur.

The firing pulses are "turned off" until current transformers 178a (CT1) and 178b (CT2) sense that the anticipated level of current is flowing in a reasonably steady manner between (+) DC electrode 24b and (−) DC electrode 24a. With 178a (CT1) and 178b (CT2) showing that DC current is flowing in (+) DC electrode 24b and (−) DC electrode 24a, then the firing pulses may "turn on" and automatically increase the DC current to their respective preset current levels.

In the event that the voltage (+) to N and the (−) to N are abnormally unequal and if there is no current flowing from the electrode showing the higher voltage, then the electrode showing no current may be automatically lowered until the current and voltage is brought within their normal operating current range.

Metal oxide varistor 180 (MOV 1) and diode 182 (D1) are used to limit the transient DC voltage imposed on rectifiers 156 (DR1) and 158 (TR). Inductors 184 ($L_2$) can store energy and deliver the stored energy rapidly (at a rate much faster than the phase angle control which is possible by the thyristor connected circuit), thereby preventing the arc from extinguishing. Current transformer 178e (CT5) is in the transformer neutral circuit. If the currents supplied to the (+) and (−) electrodes are equal, then current transformer 178e (CT5) current is zero. If theses currents are unequal, then current transformer 178e (CT5) adjusts the electrode gate until the circuits are equal.

The circuits described above allow joule heating AC power supply 66 to provide near constant melt temperatures throughout unit 12, thereby minimizing sizing constraints for the arc, i.e., arc power, electrode diameter, and the like. The DC arc is primarily present in the furnace-melter for feed rate enhancement. This makes this newly configured melter technology more flexible than other available vitrification systems. The arc supplies the energy in the unmelted overburden of incoming feed, and the joule heated portion of the melter system maintains the hot glass pool to ensure complete dissolution and mixing of the glass mixture as well as longer residence time for waste decomposition.

If the arc technology was used alone, the electrode-hearth diameter ratio would have to be large to ensure that the contents of the hearth is melted sufficiently not only at the center of the hearth, but also at the walls of the hearth. The size of the hearth therefore would be limited due to practical limitations on electrode cost and diameter. When the hearth or glass tank is joule heated, however, this limitation no longer exists and the tank can be sized to ensure the residence time is adequate for complete mixing and dissolution of all glass components.

If the joule heated melter technology were employed without the arc, the feed rates would be much lower due to limitations in heat transfer from the melt pool to the unmelted feed above the molten glass. To accommodate large throughput requirements, the standard approach is to increase the melt surface area. Accordingly, the joule heated melter would need to be much larger for a given processing rate than the combined arc melter system of the present invention. The present invention thus utilizes the benefits of both the DC arc and AC joule heated melter technologies, and does so in a single optimized system.

Multiple arc electrodes may be used to start or restart this combined system, but once the melt is heated, joule heating may be used to maintain a molten bath during long idling periods. This means that the arc may be initiated immediately in the transferred mode for start or restart of arc operations.

The rapid heating rate also results in the production of a higher quality of pyrolysis gas. More energy is recovered and there are less pollutants in the gas emissions. Additionally, the joule heated melter portion of the present invention provides a larger reservoir with demonstrated mixing to produce a homogeneous glass product with very high stability. This is beneficial since vitrified glass product is stable over geologic time frames. See e.g., Buelt et al., *In Situ Vitrification of Transuranic Wastes. Systems Evaluation and Applications Assessment*, PNL-4800 Supplement 1, Pacific Northwest Laboratory, Richland, Wash. (1987). The present invention provides further volume reduction through the vitrification of the ash as compared with that ash that would be generated from incineration alone. See, Chapman, C., *Evaluation of Vitrifying Municipal Incinerator Ash, Ceramic Nuclear Waste Management IV*, Ceramic Transactions, G. G. Wicks, Ed., Vol. 23, pp. 223–231, American Ceramic Society (1991).

As discussed above, the present invention provides methods and apparatus that facilitate rapid pyrolysis. Rapid pyrolysis results in a pyrolysis gas having higher purity than other means of pyrolysis. The high purity gas facilitates use with recently developed high efficiency small gas turbine technology, thereby significantly increasing efficiency as compared with conventional steam turbines and decreasing the unit size of the turbine required. The DC arc provides a high temperature heat source to accomplish the rapid pyrolysis effectively. The tunable combination of arc plasma and joule heated melter operation can be utilized to facilitate rapid pyrolysis with minimal generation of particulate emission. Graef, et al., *Product Distribution in the Rapid Pyrolysis of Biomass/Lignin for Production of Acetylene*, Biomass as a Nonfossil Fuel Source, American Chemical Society (1981) have shown that under conditions such as those found in a plasma furnace, municipal solid waste can be pyrolyzed into a gaseous product as shown in Table 1.

TABLE 1

Gas Composition from Pyrolysis of MSW in Plasma Furnace.

| | Rapid Pyrolysis | Normal Pyrolysis |
|---|---|---|
| Percent Conversion to useful gas for combustion | > 65% | 45%–50% |
| Gas Species | | |
| $CO_2$ | 2% | 10% |
| CO | 44% | 50% |
| $H_2$ | 43% | trace |
| $CH_4$ | 2% | 38% |
| Light HC's | bal | bal |
| HHV (BTU/SCF) | 350–400 | 300–350 |

It is important to note that in comparing normal pyrolysis to that of rapid pyrolysis, a greater fraction of the incoming waste is converted to gas. Thermal or normal pyrolysis promotes liquefaction giving only 45–50% conversion to pyrolysis gases, while rapid pyrolysis has gas yields of greater than 65%. Rapid pyrolysis of municipal waste has been demonstrated using a water cooled, metal plasma torch. See, Carter, et al., *Municipal Solid Waste Feasibility of Gasification with Plasma Arc, industrial and Environmental Applications of Plasma*, Proceedings of the First International EPRI Plasma Symposium (May 1990). In the partial oxidation mode of operation, the residue from both techniques is oxidized to offset the pyrolysis energy requirements.

The pyrolysis gases produced in accordance with the present invention are well suited for combustion in a state of the art, high efficiency gas turbine generator. With the efficiency of new gas turbine-combined cycle systems approaching 50%, the present method of waste-to-energy conversion provides an effective alternative to standard waste incinerators. Under favorable conditions, the incinerator-steam generator systems achieve 15–20% efficiency in the conversion of the potential energy contained in the waste to usable electric energy.

The high quality, vitrified products produced in accordance with the present invention may be used in a variety of applications. For example, the vitrified products may be crushed and incorporated into asphalt for use in roads and the like. Alternatively, the vitrified products may be utilized to replace cinder in cinder or building blocks, thereby minimizing absorption of water within the block. Further, the vitrified products may be solidified to a final form which exhibits substantial volume reduction over prior art vitrification products. The solidified form is suitable for disposal without health risks or risks to the environment.

In another embodiment of the invention, tunable arc plasma-melter systems are employed utilizing a molten oxide pool. The composition of the molten oxide pool can be modified to have electrical, thermal and physical characteristics capable of processing metals, non-glass forming wastes and low-ash producing wastes in a manner capable of generating a low to medium BTU gas. The conductivity of the molten pool is controlled by adding melt modifier materials so that the joule heated portion of the system can effectively maintain the temperature of the melt even when under conditions such as 100% joule heating operation. It is desirable to maintain the electrical resistivity of the molten pool in a certain range. For example, for some configurations of the tunable arc plasma melter, it is desirable that the molten pool composition be maintained with an electrical resistivity above 1 Ohm-cm for effective joule heating of the molten oxide pool. Preferably, the electrical resistivity is in the range of 1–200 Ohm-cm, and more preferably, in the range of 5–15 Ohm-cm.

This embodiment of the invention provides tunable arc plasma-melter systems exhibiting a high degree of controllability and efficiency for a wide variety of waste streams that have been particularly difficult to treat in the past. Exemplary non-glass forming wastes include tires and metals such as iron. Illustrative low-ash producing organics include plastics, oils, solvents and the like. Waste streams such as hazardous organic liquids, mixtures of low-ash producing organics and metals, or organic matter with limited ash content and high metal content are all processable with the controlled composition molten oxide pool variation of the tunable plasma arc melter system. Wastes such as sludges containing primarily reduced metals are not well suited for processing in joule heated glass tanks due to the high electrical conductivity of the resultant melt. However, using the controlled composition oxide pool mode of operation, the tunable arc plasma process can even process melts that result in molten metal baths which are gravimetrically separated from the slag.

Figure 8:
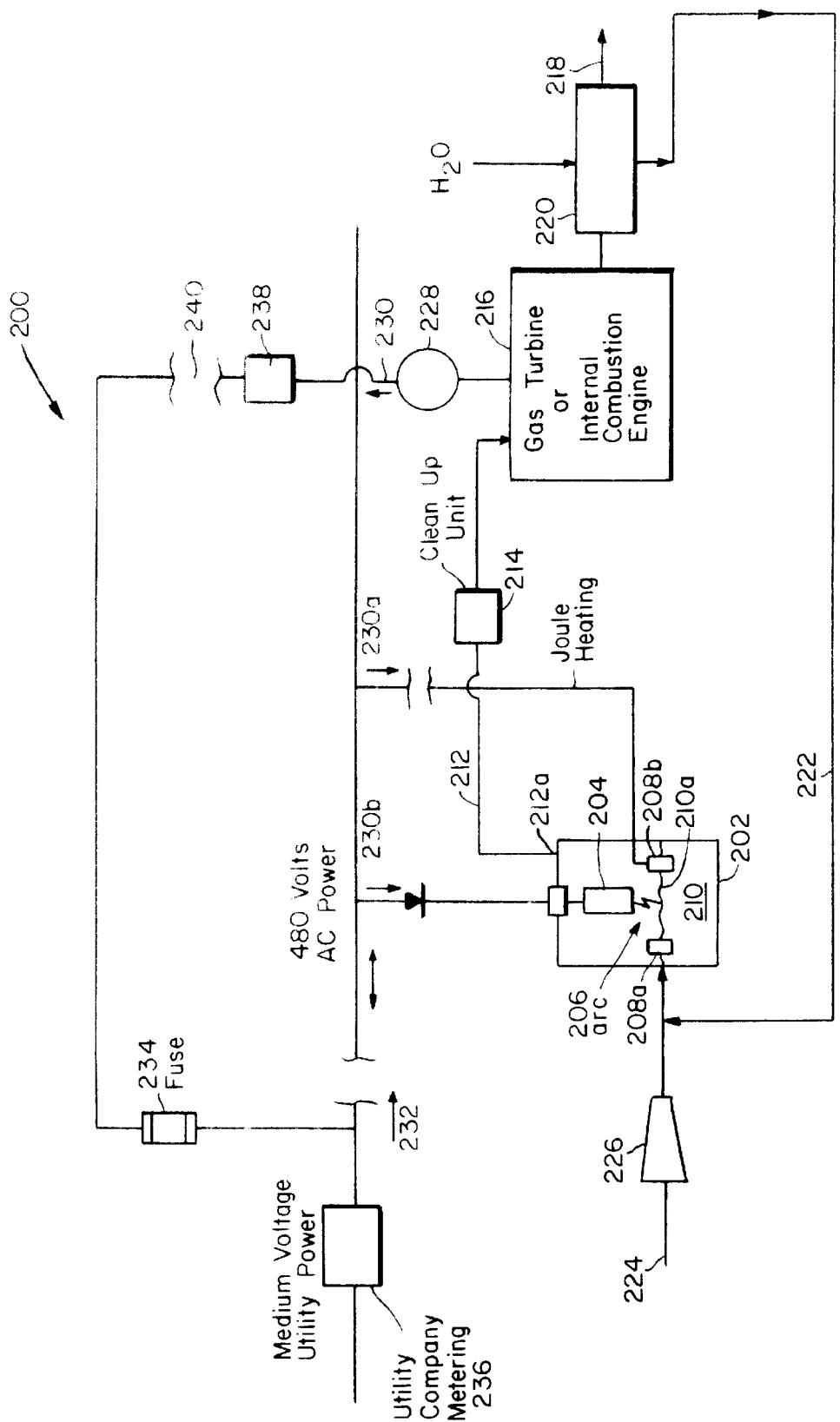
FIG. 8 illustrates an electrical system of an alternative embodiment of the invention which is suitable for processing metals, non-glass forming waste, and low-ash producing organics.

A system suitable for processing of metals, non-glass forming wastes and low-ash producing inorganics according to the present invention is illustrated in FIG. 8. The system 200 includes furnace 202, clean-up unit 214, a gas turbine or internal combustion engine 216 and generator 228. System 200 may also include heat exchanger 220 and compressor 226.

As discussed in greater detail herein, a waste stream such as sludge containing metals, non-glass forming wastes and low-ash producing inorganics is introduced into furnace 202. The waste stream is combined with a molten oxide pool 210 having a composition with desired electrical, thermal and physical characteristics. Molten pool 210 is contacted with DC arc 206. DC arc 206 can be operated using DC arc electrode 204 in combination with joule heating electrodes 208a and 208b as described hereinabove. It will be appreciated by those skilled in the art that various furnace configurations may be suitable for use in the system shown in FIG. 8. For example and as shown in FIGS. 4(a)–4(d), joule heating electrodes may include more than two electrodes and additional DC arc electrodes may be employed.

During the processing of some waste streams, it may be desirable to contact the surface 210a of molten oxide pool 210 with a predetermined amount of steam 222. Steam 222, for example, can be employed to facilitate the use of a water-gas reaction as follows:

$$C + H_2O \rightarrow CO + H_2 \qquad (1)$$

Steam 222 is introduced into furnace 202 directly above or at the surface 210a of molten pool 210. In this manner, carbonaceous waste materials may be processed and transformed to form a hydrogen-rich gas 212. The hydrogen-rich gas 212 produced by the system exits through port 212a and is cleaned in clean up unit 214. Hydrogen sulfide ($H_2S$), sulfur oxides ($SO_x$) and hydrogen chloride (HCl) are removed from hydrogen-rich gas 212 in clean up unit 214. Clean up unit 214 may be a scrubber(s) or the like. The hydrogen-rich gas is then combusted in an internal combustion engine 216. Internal combustion engine 216 is connected to generator 228 to produce electricity 230. In an alternative embodiment, internal combustion engine 216 may be substituted with a high efficiency gas turbine.

Figure 11A:
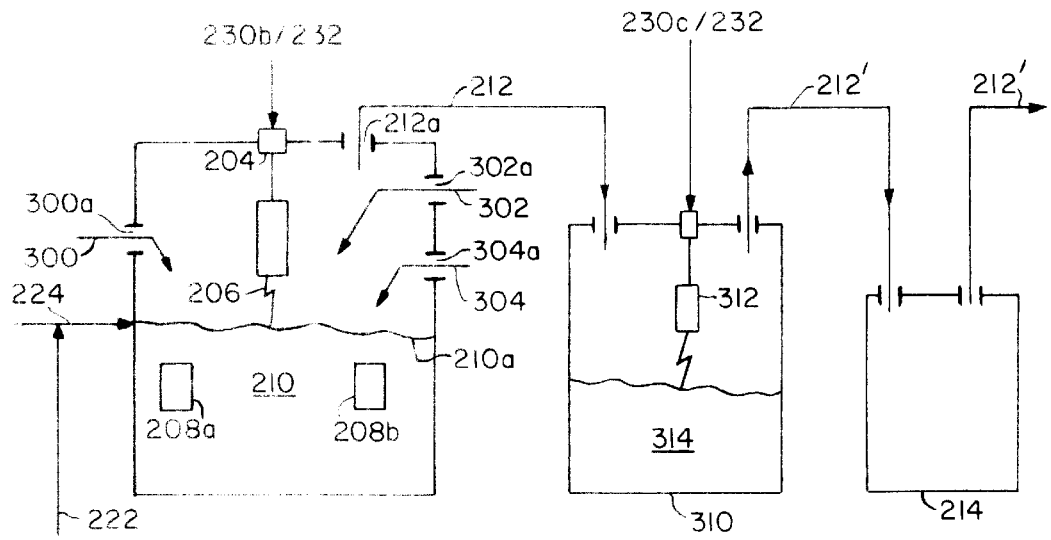
FIGS. 11(a) and 11(b) shows a furnace and molten oxide pool for processing non-glass forming waste and low-ash producing organics in accordance with the invention.
Figure 11B:
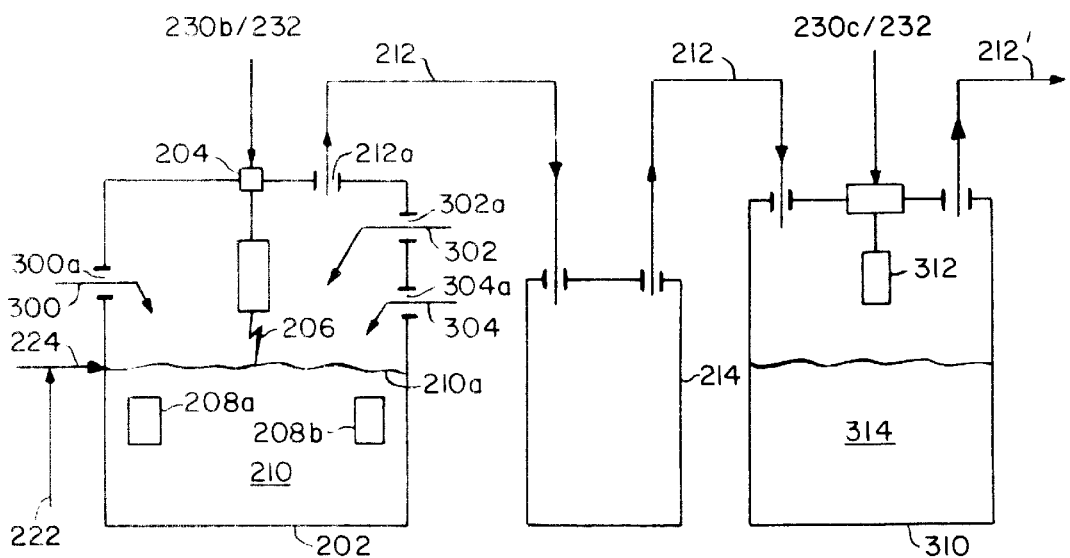

Electricity 232 may be supplied accordingly from an external source such as a utility company to provide power for the DC arc and joule heating functions of furnace 202. Such electricity is subjected to monitoring 236 or the like. Additionally, a portion 230b of electricity 230 can be used to assist in powering DC arc electrode 204 while a portion 230a of electricity 230 can be used to assist in powering the joule heating electrodes. A portion of electricity 230c may also be utilized in a secondary plasma reaction chamber (as shown in FIGS. 11(a) and 11(b)). Additional electricity 230 can be sold or utilized in a commercial manner. Such electricity exits generator 230 and can be controlled by circuit breaker 238, transformer 240 and fuse 234.

Figure 9:
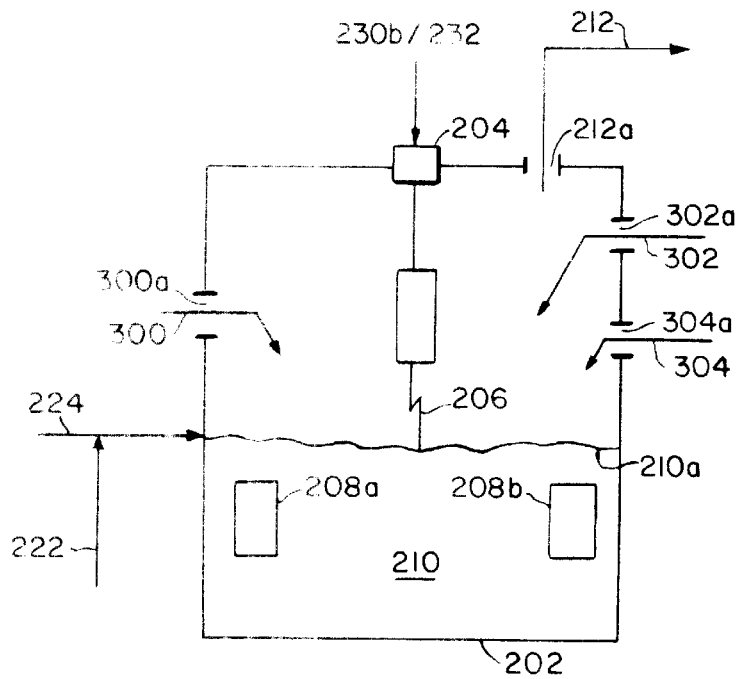
FIG. 9 shows a furnace and molten oxide pool for processing metals, non-glass forming waste, and low-ash producing organics in accordance with the invention.
Figure 10:
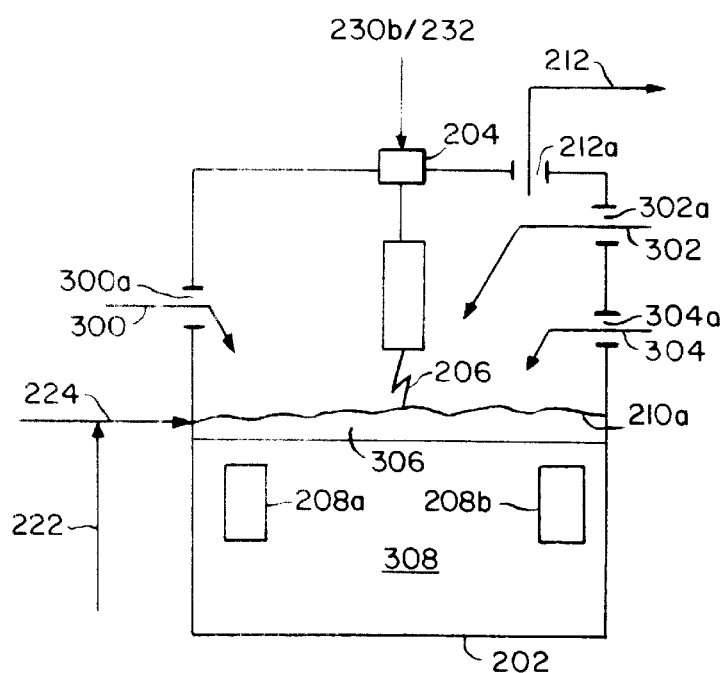
FIG. 10 shows a furnace and molten oxide pool for processing metals in accordance with the invention.

Waste heat in exhaust gas 218 from the gas turbine or internal combustion engine 216 can be used to produce steam 222 for the water-gas and water shift reactions by employing heat exchanger 220 as shown in FIG. 8. Controlled quantities of air 224, may under certain circumstances, be introduced into system 200 using compressor 226. Such circumstances may occur where energy recovery is not desired or practical, e.g. if it is determined that the waste form redox state must be higher to ensure a stable waste form. Under these conditions, the furnace system has the capability to operate under fully oxidizing conditions. Furnace 202 is constructed such that the amount of air entering the system can be controlled. For example, ports such as 300a, 302a and 304a discussed herein in connection with FIGS. 9–11 are designed to allow introduction and/or removal of various streams into furnace 202. The constituents of the molten pool are chosen to be optimum for a given waste stream without allowing undesirable ingress or egress of air therethrough.

The present invention allows the use of a molten oxide pool from material other than the primary waste material being processed to provide the desired medium for effective use of the tunable arc plasma-melter portions of the system. Referring to FIG. 9, a furnace suitable for processing metals, non-glass forming wastes and low-ash producing inorganics is illustrated.

As discussed above in connection with FIG. 8, furnace 202 includes one or more DC arc electrodes 204 capable of generating DC arc 206. Furnace 202 also includes joule heating capabilities, including joule heating electrodes 208a and 208b.

Primary waste stream 300 to be processed is introduced into furnace 202 through port 300a. Melt modifier(s) 302 is introduced into furnace 202 through port 302a. Alternatively, or in addition to melt modifier 302, a secondary waste stream 304 having desired glass forming characteristics is introduced into furnace 202 through port 304a.

The constituents of the molten pool are chosen to be optimum for a given waste stream. While not to be construed as limiting, melt modifiers 302 may for example include dolomite ($CaCO_3 \cdot MgCO_3$), limestone (e.g. calcium carbonate, $CaCO_3$), sand (e.g. glass maker's sand), glass frit, anhydrous sodium carbonate (soda ash), other glass forming constituents and/or sand combined with metals. It will be appreciated by those skilled in the art that other glass melt modifiers may be used in accordance with the present invention. The molten oxide pool may also be formed utilizing melt modifier combinations of secondary wastes and material(s) other than the primary waste being treated. For example, the secondary waste with the proper glass forming composition may be simultaneously fed to the furnace with the primary waste and/or other melt modifier(s) to maintain the molten oxide pool within the proper compositional range. The constituents of the molten pool are selected based upon a given waste stream. This mode of operation provides a high degree of flexibility in the operation of the tunable arc plasma-joule heated melter system, thereby broadening the waste types for which the system can treat.

It should be appreciated by those skilled in the art that the molten oxide pool provides flexibility beyond that of either the joule-heated melter or standard plasma arc processes relative to melt modifier addition. With highly conductive oxide mixtures, a joule heated system may be ineffective or unable to maintain melt bath temperature without the added energy provided by the arc. Conversely, with highly resistive oxide melts, the potential across the joule heated electrodes can become unacceptably high and adequate current cannot be maintained to provide joule heating. The supplemental energy can be provided by the arc. The arc energy, however, can be limited in both of these situations to provide only enough energy to process incoming waste and supplement joule heating energy to maintain melt bath temperature. The molten oxide pool embodiment of the present invention provides a much greater degree of flexibility in melt adjustment using melt modifiers than either that of a joule-heated melter system or a standard arc plasma process.

The melt modifiers 302 and/or secondary waste stream 304 are selected to provide a molten pool having desired electrical, thermal and physical characteristics. The type and amount of melt modifiers are determined for the specific vitrification unit configuration and waste stream. For example, the molten pool in the case of processing tires in a waste stream 300 provides sufficient conductivity to use the joule heated melter subsystem in the more optimum mode of operation. As discussed above, steam is added in the desired amounts directly above or to the molten pool to facilitate the use of a water-gas reaction or to remove excess carbonaceous material.

FIG. 10 illustrates a furnace suitable for processing certain metals utilizing a molten oxide pool in accordance with the invention. When metals are being processed, the controlled composition molten pool may be altered such that a molten metal oxide layer is disposed above a dense metal layer in the furnace hearth. Preferably, the positioning of the joule heating electrodes can be varied according to the type and volume of waste being processed. When the waste feed material has a high metals content for example, the joule heating electrodes may be raised or lowered to adjust or "tune" the effective resistive path between electrodes. This may be required if the metal layer is allowed to increase to a point where the electrical path between the joule heated electrodes is effectively "shorted" due to contact or near contact with the highly conductive metal layer. In addition, the number of joule heating electrodes can be varied depending on the type and amount of waste material being processed.

As further shown in FIG. 10, molten metal oxide layer 306 is disposed above a dense metal layer 308 in the furnace 202. The conductivity of the joule heated molten pool 306/308 is controlled by adding melt modifier materials 302 and/or secondary waste stream materials 304 such that the joule heated portion of the system can effectively maintain the temperature of the melt even when under conditions such as 100% joule heating operation.

It is desirable to maintain the electrical resistivity of the molten pool in a certain range. For example, for some configurations of the tunable arc plasma melter, it is desirable that the molten pool composition be maintained with an electrical resistivity above 1 Ohm-cm for effective joule heating of the molten oxide pool. Preferably, the electrical resistivity is in the range of 1–200 Ohm-cm, and more preferably, between 5–15 Ohm-cm.

FIGS. 11(a) and 11(b) illustrate exemplary primary and secondary furnace configurations in the accordance with the present invention. In the case of automobiles and truck tires or other non-glass forming waste streams, the tunable molten oxide pool plasma arc melter process allows for the efficient conversion of whole tires into a low to medium BTU gas and any metal present is separated in a metal phase below the oxide melt layer. In this manner, tires can be removed from vehicles without dissection and are amenable to processing in the tunable arc plasma melter system. Steel belting and rim materials can be reclaimed from the molten metal phase.

To accomplish the conversion of tire rubber to primarily synthesized gas (i.e. hydrogen and carbon monoxide), steam and possibly controlled quantities of air may be added to the melt chamber in a controlled manner to facilitate a series of reactions as shown below. The steam and air mixture can be added through a port, using tuyeres or the like positioned such that the steam/air mixture will be introduced into the furnace at the melt surface. This will ensure that carbonaceous material is converted to gaseous products and not trapped in the glass/slag matrix.

Chemical equations (1)–(5) present possible reactions that will occur upon introduction of oxygen and/or steam into the melt chamber of furnace 202.

$$C+H_2O \rightarrow CO+H_2 \qquad (1)$$

$$C+CO_2 \rightarrow 2CO \qquad (2)$$

$$CO+H_2O \rightarrow CO_2+H_2 \qquad (3)$$

$$C+O_2 \rightarrow CO_2 \qquad (4)$$

$$C+2H_2 \rightarrow CH_4 \qquad (5).$$

Reactions (1) and (2) are highly endothermic reactions, requiring about 131.4 kJ/mole and 172.6 kJ/mole, respectively. With the controlled introduction of primarily steam at near atmospheric pressure, reaction (1), i.e. the water-gas reaction, will predominate requiring energy (i.e. 131.4 kJ/mole) to produce a hydrogen-rich gas. As discussed above, this gas is cleaned using particulate removal technology and scrubbing solutions to remove the majority of particulates and other contaminants such as sulfur and chlorine in the form of $H_2S$, $SO_x$ and HCl prior to combustion either in a gas turbine or internal combustion engine electrical generator system. Waste heat will be utilized to produce steam for the furnace chamber steam feed stream. High temperature air may be extracted from an intermediate stage in a gas turbine if additional thermal energy is required.

The processing of materials containing a high carbon to hydrogen ratio may result in the production of excess carbon (i.e. unreacted char) in the primary furnace exhaust. For example, tires typically contain a high carbon to hydrogen ratio. This excess carbon or unreacted char may be converted to useful gaseous fuel 212' or to heat in a secondary plasma reaction chamber 310 as shown in FIG. 11(a) and 11(b). This chamber will provide thermal energy from a transferred plasma arc and/or plasma torch 312 to drive the desired reactions, i.e. reaction (1) set forth above. Electricity 230c and/or 232 can be supplied to secondary reaction chamber 310 as also shown in FIG. 11(a) and 11(b). As in the primary furnace chamber, steam and possibly air or oxygen (not shown in FIGS. 11(a) and 11(b)) can be added directly above or to slag 314, resulting in the complete conversion of carbon and carbon containing compounds to carbon monoxide and hydrogen gas.

The char produced from high carbon content wastes (e.g. tires) may also accumulate on the surface of the oxide melt. To ensure a more complete carbon conversion, both steam and controlled quantities of air may be introduced at or above the melt line as described above. Reaction (4) described above will predominate in the presence of air, thereby resulting in a net thermal energy production of about 393.8 kJ/mole of reacted carbon. This thermal energy will drive reaction (1) in this surface zone due to the simultaneous introduction of steam and air. The air-steam mixture can be accurately controlled to provide the desired gaseous product from the furnace system. For example, the water shift reaction can be used to convert coke deposits or accumulations in the furnace hearth to carbon monoxide and hydrogen-rich gas. In some situations, it may desirable to allow a portion of the coke to remain in the furnace hearth to reduce electrode erosion.

The hydrogen-rich gas produced by the system can be cleaned and then combusted in a gas turbine or internal combustion engine and subsequently used to produce electricity in a generator. In preferred embodiments, the waste heat from the gas turbine or internal combustion engine can be used to produce steam for the water-gas reaction in the melter unit. In circumstances where an internal combustion engine or gas turbine are not employed, steam may also be obtained by partially cooling furnace off-gas 212 and using this steam for the water-shift reaction.

When carbonaceous materials such as tires are processed in a pyrolytic mode with steam and controlled quantities of air, the processed materials can produce a low to medium BTU gas suitable for combustion in a high efficiency (e.g. 35–50%) gas turbine or internal combustion engine. The tunable plasma arc melter system can also produce excess electrical power when processing the carbonaceous material in the pyrolytic mode described hereinabove. The electrical power from the gas turbine or internal combustion engine generator may be supplied to assist the furnace power supply. This system can also provide additional AC power to the joule heating portion of the melter and/or a utility company, thereby providing the opportunity to reduce operating expenses or generate additional revenue.

It should be appreciated by those skilled in the art that the specific embodiments disclosed above may readily be utilized as a basis for modifying or designing other structures for carrying out the same purpose of the present invention. It should also be realized by those skilled in the art that such equivalent constructions do not depart from the spirit and scope of the invention as set forth in the appended claims.

What is claimed is:

1. An integrated arc plasma-joule heated melter waste conversion unit, comprising:
    at least one arc plasma electrode; and
    a plurality of pairs of joule heating electrodes, each pair of the joule heating electrodes having first and second electrodes, the plurality of the pairs of the joule heating electrodes having relative directions of current flow to the other pairs of the joule heating electrodes such that current paths through a bath in the unit cause stirring of the bath;
    wherein the at least one arc plasma electrode and the plurality of pairs of the joule heating electrodes are arranged such that during simultaneous operation of the at least one arc plasma electrode and the plurality of the joule heating electrodes, the at least one arc plasma electrode provides a heat source that is separately and independently controlled from a heat source provided by the plurality of the joule heating electrodes.

2. The waste conversion unit of claim 1, wherein the pairs of joule heating electrodes include first, second and third pairs of joule heating electrodes.

3. The waste conversion unit of claim 2, wherein the number of arc plasma electrodes is two.

4. The waste conversion unit of claim 3, wherein the number of arc plasma electrodes is three.

5. The waste conversion unit of claim 4, wherein the number of arc plasma electrodes is four.

6. The waste conversion unit of claim 4, wherein the number of arc plasma electrodes is six.

7. The waste conversion unit of claim 4, wherein the first and second electrodes of the first pair of the joule heating electrodes are positioned substantially opposed to one another in the unit, wherein the first and second electrodes of the second pair of the joule heating electrodes are positioned substantially opposed to one another in the unit, wherein the first and second electrodes of the third pair of the joule heating electrodes are positioned substantially opposed to one another in the unit and wherein the relative direction of current flow of the second pair of the joule heating electrodes is opposite the relative directions of current flow of the first and third pairs of the joule heating electrodes.

8. The waste conversion unit of claim 7, wherein the first electrode of the second pair of the joule heating electrodes is positioned substantially between the first electrodes of the first and third pairs of the joule heating electrodes and wherein the second electrode of the second pair of the joule heating electrodes is positioned substantially between the second electrodes of the first and third pairs of the joule heating electrodes.

9. The waste conversion unit of claim 8, wherein the number of arc plasma electrodes is two.

10. The waste conversion unit of claim 8, wherein the number of arc plasma electrodes is three.

11. The waste conversion unit of claim 8, wherein the number of arc plasma electrodes is four.

12. The waste conversion unit of claim 8, wherein the number of arc plasma electrodes is six.

13. The waste conversion unit of claim 1, wherein the pairs of joule heating electrodes include first and second pairs of joule heating electrodes.

14. The waste conversion unit of claim 13, wherein the number of arc plasma electrodes is two.

15. The waste conversion unit of claim 13, wherein the number of arc plasma electrodes is three.

16. The waste conversion unit of claim 13, wherein the number of arc plasma electrodes is four.

17. The waste conversion unit of claim 13, wherein the number of arc plasma electrodes is six.

18. The waste conversion unit of claim 13, wherein the first and second electrodes of the first pair of the joule heating electrodes are positioned substantially opposed to one another in the unit, wherein the first and second electrodes of the second pair of the joule heating electrodes are positioned substantially opposed to one another in the unit and wherein the relative direction of current flow of the second pair of the joule heating electrodes is opposite the relative direction of current flow of the first pair of the joule heating electrodes.

19. The waste conversion unit of claim 18, wherein the number of arc plasma electrodes is two.

20. The waste conversion unit of claim 18, wherein the number of arc plasma electrodes is three.

21. The waste conversion unit of claim 18, wherein the number of arc plasma electrodes is four.

22. The waste conversion unit of claim 18, wherein the number of arc plasma electrodes is six.

* * * * *